(12) United States Patent
Johnston et al.

(10) Patent No.: US 7,909,954 B2
(45) Date of Patent: Mar. 22, 2011

(54) METHOD AND APPARATUS FOR WINDING A FILTER MEDIA PACK

(75) Inventors: Stan Johnston, Kearney, NE (US);
Brian T. Ehrenberg, Kearney, NE (US);
Kyle Swanson, Kearney, NE (US);
Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 882 days.

(21) Appl. No.: 11/775,038

(22) Filed: Jul. 9, 2007

(65) Prior Publication Data

US 2008/0011896 A1    Jan. 17, 2008

Related U.S. Application Data

(63) Continuation-in-part of application No. 10/979,987, filed on Nov. 3, 2004, now Pat. No. 7,255,300.

(51) Int. Cl.
*B32B 37/00* (2006.01)
*B65H 81/00* (2006.01)

(52) U.S. Cl. .................. 156/195; 156/189; 156/184

(58) Field of Classification Search .................. 156/184, 156/189, 195

See application file for complete search history.

(56) References Cited

U.S. PATENT DOCUMENTS

| | | |
|---|---|---|
| 1,943,080 A | 1/1934 | Langston |
| 1,947,066 A | 2/1934 | Sieg |
| 1,954,881 A | 4/1934 | List |
| 3,025,963 A | 3/1962 | Bauer |
| 3,255,889 A | 6/1966 | Goldman et al. |
| 3,397,518 A | 8/1968 | Rogers |
| 3,438,588 A | 4/1969 | Steinholtz et al. |
| 3,676,247 A | 7/1972 | Morris et al. |
| 3,679,057 A | 7/1972 | Perez |
| 4,252,591 A | 2/1981 | Rosenberg |
| 4,253,228 A | 3/1981 | Easley |
| 4,257,790 A | 3/1981 | Bergquist et al. |

(Continued)

FOREIGN PATENT DOCUMENTS

JP    S60-112320    7/1985

(Continued)

OTHER PUBLICATIONS

U.S. Appl. No. 11/634,647, filed Dec. 6, 2006, Merritt et al.

(Continued)

*Primary Examiner* — Jeff H Aftergut
(74) *Attorney, Agent, or Firm* — Reinhart Boerner Van Deuren P.C.

(57) ABSTRACT

A method and apparatus are provided, for forming a filter element including a media pack in the form of a coiled fluted filter media, by winding the web of fluted filter media around a pair of tools of a mandrel. The tools engage the sides of the filter media. The tools define a major to provide the media pack with a oblong or elongated shape. The web may be fed at constant linear speed, and/or a motor may be controlled in a manner to provide constant driving torque to maintain a constant tension on the web. The winding apparatus and methods may include apparatus or methods to modify the feed path of the web to adjust the tension of the web as it is being wound. Further, the coiled media packs can be fixtured to prevent relaxation. A method may form various shaped media packs with the same apparatus.

22 Claims, 35 Drawing Sheets

U.S. PATENT DOCUMENTS

| | | | |
|---|---|---|---|
| 4,450,027 A * | 5/1984 | Colson | 156/193 |
| 4,498,989 A | 2/1985 | Miyakawa et al. | |
| 4,579,698 A | 4/1986 | Meyering et al. | |
| 4,589,983 A | 5/1986 | Wydevan | |
| 4,720,292 A | 1/1988 | Engel et al. | |
| 4,747,944 A | 5/1988 | George | |
| 4,798,575 A | 1/1989 | Siversson | |
| 4,838,905 A | 6/1989 | Billiet et al. | |
| 4,976,677 A | 12/1990 | Siversson | |
| 4,976,857 A | 12/1990 | Solomon | |
| 5,213,275 A | 5/1993 | Giesy | |
| 5,238,474 A | 8/1993 | Kahlbaugh et al. | |
| 5,245,897 A | 9/1993 | Arnold et al. | |
| 5,338,325 A | 8/1994 | Stanelle | |
| 5,346,675 A | 9/1994 | Usui et al. | |
| 5,374,006 A | 12/1994 | Mheidle | |
| 5,389,175 A | 2/1995 | Wenz | |
| 5,435,870 A * | 7/1995 | Takagaki et al. | 156/189 |
| 5,484,466 A | 1/1996 | Brown et al. | |
| 5,543,007 A | 8/1996 | Takagaki et al. | |
| 5,588,945 A | 12/1996 | Lauderbaugh | |
| 5,609,711 A | 3/1997 | Miller | |
| 5,685,985 A | 11/1997 | Brown et al. | |
| 5,720,790 A | 2/1998 | Kometani et al. | |
| 5,755,843 A | 5/1998 | Sundquist | |
| 5,772,883 A | 6/1998 | Rothman et al. | |
| 5,785,272 A * | 7/1998 | Slade et al. | 242/532.5 |
| 5,792,247 A | 8/1998 | Gillingham et al. | |
| 5,810,281 A * | 9/1998 | Kole | 242/532.6 |
| 5,820,646 A | 10/1998 | Gillingham et al. | |
| 5,895,574 A | 4/1999 | Friedmann et al. | |
| 5,902,364 A | 5/1999 | Tokar et al. | |
| 6,022,305 A | 2/2000 | Choi et al. | |
| 6,048,386 A | 4/2000 | Gillingham et al. | |
| 6,179,890 B1 | 1/2001 | Ramos et al. | |
| D437,402 S | 2/2001 | Gieseke et al. | |
| 6,190,432 B1 | 2/2001 | Gieseke et al. | |
| 6,210,469 B1 | 4/2001 | Tokar | |
| 6,221,122 B1 | 4/2001 | Gieseke et al. | |
| 6,235,195 B1 * | 5/2001 | Tokar | 210/238 |
| D450,827 S | 11/2001 | Gieseke et al. | |
| D450,828 S | 11/2001 | Tokar | |
| 6,348,084 B1 | 2/2002 | Gieseke et al. | |
| 6,348,085 B1 | 2/2002 | Tokar et al. | |
| 6,350,291 B1 | 2/2002 | Gieseke et al. | |
| 6,368,374 B1 | 4/2002 | Tokar et al. | |
| 6,402,798 B1 | 6/2002 | Kallsen et al. | |
| D460,169 S | 7/2002 | Anderson et al. | |
| D461,003 S | 7/2002 | Gieseke et al. | |
| 6,416,605 B1 | 7/2002 | Golden | |
| D461,884 S | 8/2002 | Gieseke et al. | |
| 6,436,162 B1 | 8/2002 | Wake et al. | |
| 6,447,567 B1 | 9/2002 | Ehrenberg | |
| D466,602 S | 12/2002 | Gieseke et al. | |
| 6,517,598 B2 | 2/2003 | Anderson et al. | |
| 6,533,845 B2 | 3/2003 | Tokar et al. | |
| D473,637 S | 4/2003 | Golden | |
| 6,547,857 B2 | 4/2003 | Gieseke et al. | |
| 6,599,344 B2 | 7/2003 | Tokar et al. | |
| 6,610,117 B2 | 8/2003 | Gieseke et al. | |
| 6,610,126 B2 | 8/2003 | Xu et al. | |
| 6,610,177 B2 | 8/2003 | Tsay et al. | |
| D483,459 S | 12/2003 | DeWit et al. | |
| D484,584 S | 12/2003 | Anderson et al. | |
| 6,673,136 B2 | 1/2004 | Gillingham et al. | |
| 6,703,675 B1 | 3/2004 | Rodgers | |
| 6,706,087 B1 | 3/2004 | Gebler et al. | |
| 6,743,317 B2 | 6/2004 | Wydeven | |
| 6,746,518 B2 | 6/2004 | Gieseke et al. | |
| 6,783,565 B2 | 8/2004 | Gieseke et al. | |
| 6,851,569 B2 | 2/2005 | Conti et al. | |
| 6,852,141 B2 | 2/2005 | Bishop et al. | |
| 6,878,190 B1 | 4/2005 | Xu et al. | |
| 6,887,343 B2 | 5/2005 | Schukar et al. | |
| 6,893,561 B2 | 5/2005 | Janiek | |
| D506,539 S | 6/2005 | Bishop et al. | |
| 6,946,012 B1 | 9/2005 | Miller et al. | |
| 6,959,819 B2 | 11/2005 | Moscaritolo et al. | |
| 6,960,245 B2 | 11/2005 | Tokar et al. | |
| 6,966,940 B2 | 11/2005 | Krisko et al. | |
| 6,974,490 B2 | 12/2005 | Gillingham et al. | |
| 6,994,744 B2 | 2/2006 | Tokar et al. | |
| 6,997,968 B2 | 2/2006 | Xu et al. | |
| 7,001,450 B2 | 2/2006 | Gieseke et al. | |
| 7,008,465 B2 | 3/2006 | Graham et al. | |
| 7,008,467 B2 | 3/2006 | Krisko et al. | |
| 7,090,712 B2 | 8/2006 | Gillingham et al. | |
| 7,150,903 B2 | 12/2006 | Frey | |
| 7,168,573 B2 | 1/2007 | Brown et al. | |
| 7,179,317 B2 | 2/2007 | Chung et al. | |
| 7,211,124 B2 | 5/2007 | Gieseke et al. | |
| 7,252,704 B2 | 8/2007 | Tokar et al. | |
| 7,255,300 B2 | 8/2007 | Johnston | |
| 7,270,692 B2 | 9/2007 | Gillingham et al. | |
| 7,282,075 B2 | 10/2007 | Sporre et al. | |
| 7,303,604 B2 | 12/2007 | Gieseke et al. | |
| 7,316,723 B2 | 1/2008 | Chung et al. | |
| 7,318,851 B2 | 1/2008 | Brown et al. | |
| 7,318,852 B2 | 1/2008 | Chung et al. | |
| 7,323,029 B2 | 1/2008 | Engelland et al. | |
| 7,329,326 B2 | 2/2008 | Wagner et al. | |
| 7,338,544 B2 | 3/2008 | Sporre et al. | |
| 7,351,270 B2 | 4/2008 | Engelland et al. | |
| 7,364,601 B2 | 4/2008 | Xu et al. | |
| 7,393,375 B2 | 7/2008 | Xu et al. | |
| 7,396,375 B2 | 7/2008 | Nepsund et al. | |
| 7,396,376 B2 | 7/2008 | Schrage et al. | |
| 7,458,468 B2 | 12/2008 | Desmarais | |
| 2002/0100262 A1 | 8/2002 | Gieseke et al. | |
| 2003/0146149 A1 | 8/2003 | Binder et al. | |
| 2003/0217534 A1 | 11/2003 | Krisko et al. | |
| 2004/0071940 A1 | 4/2004 | Frey | |
| 2004/0118771 A1 | 6/2004 | Schukar et al. | |
| 2005/0252182 A1 | 11/2005 | Golden et al. | |
| 2006/0091061 A1 | 5/2006 | Brown | |
| 2006/0091064 A1 | 5/2006 | Brown et al. | |
| 2006/0091066 A1 | 5/2006 | Driml et al. | |
| 2006/0091084 A1 | 5/2006 | Merritt et al. | |
| 2006/0101795 A1 | 5/2006 | Krisko et al. | |
| 2006/0151655 A1 | 7/2006 | Johnston | |
| 2006/0163150 A1 | 7/2006 | Golden et al. | |
| 2007/0039296 A1 | 2/2007 | Schrage et al. | |
| 2007/0175194 A1 | 8/2007 | Nepsund et al. | |
| 2007/0193236 A1 | 8/2007 | Merritt | |
| 2007/0199285 A1 | 8/2007 | Gieseke et al. | |
| 2007/0261374 A1 | 11/2007 | Nelson et al. | |
| 2007/0289265 A1 | 12/2007 | Coulonvaux et al. | |
| 2008/0010959 A1 | 1/2008 | Gillingham et al. | |
| 2008/0016832 A1 | 1/2008 | Krisko et al. | |
| 2008/0022641 A1 | 1/2008 | Engelland et al. | |
| 2008/0066434 A1 | 3/2008 | Kuempel et al. | |
| 2008/0086990 A1 | 4/2008 | Kuempel et al. | |
| 2008/0110142 A1 | 5/2008 | Nelson et al. | |
| 2008/0110822 A1 | 5/2008 | Chung et al. | |
| 2008/0115470 A1 | 5/2008 | Kuempel et al. | |
| 2008/0115758 A1 | 5/2008 | Engelland et al. | |
| 2008/0209874 A1 | 9/2008 | Gieseke et al. | |
| 2008/0216654 A1 | 9/2008 | Wagner et al. | |
| 2008/0250763 A1 | 10/2008 | Widerski et al. | |
| 2008/0250766 A1 | 10/2008 | Schrage et al. | |

FOREIGN PATENT DOCUMENTS

| | | |
|---|---|---|
| JP | S60-124622 | 8/1985 |
| JP | 63-122617 | 6/1988 |
| JP | HEI 2-31131 | 8/1990 |
| WO | WO 01/37963 | 5/2001 |
| WO | WO 03/047722 | 6/2003 |
| WO | WO 2005/058461 A1 | 6/2005 |
| WO | WO 2005/077487 A1 | 8/2005 |
| WO | WO 2005/082484 A1 | 9/2005 |
| WO | WO 2005/123222 A1 | 12/2005 |
| WO | WO 2006/014941 A2 | 2/2006 |
| WO | WO 2006/017790 A1 | 2/2006 |
| WO | WO 2006/052329 A1 | 5/2006 |
| WO | WO 2006/076456 A1 | 7/2006 |

| | | |
|---|---|---|
| WO | WO 2006/076479 A1 | 7/2006 |
| WO | WO 2006/093960 A2 | 9/2006 |
| WO | WO 2007/009039 A1 | 1/2007 |
| WO | WO 2007/044677 A1 | 4/2007 |
| WO | WO 2007/056589 A2 | 5/2007 |
| WO | WO 2007/145939 A2 | 12/2007 |
| WO | WO 2008/045325 A2 | 4/2008 |
| WO | WO 2008/095196 A1 | 8/2008 |
| WO | WO 2008/098185 A1 | 8/2008 |
| WO | WO 2008/106375 A2 | 9/2008 |

OTHER PUBLICATIONS

U.S. Appl. No. 12/164,974, filed Jun. 30, 2008, Merritt et al.
U.S. Appl. No. 12/164,987, filed Jun. 30, 2008, Merritt et al.
U.S. Appl. No. 10/979,401, Nov. 2, 2004, Brown.
U.S. Appl. No. 10/979,876, Nov. 2, 2004, Brown et al.
U.S. Appl. No. 10/979,987, Nov. 3, 2004, Johnston.
U.S. Appl. No. 11/355,064, Feb. 15, 2006, Wydeven et al.
U.S. Appl. No. 11/357,788, Feb. 17, 2006, Merritt.

* cited by examiner

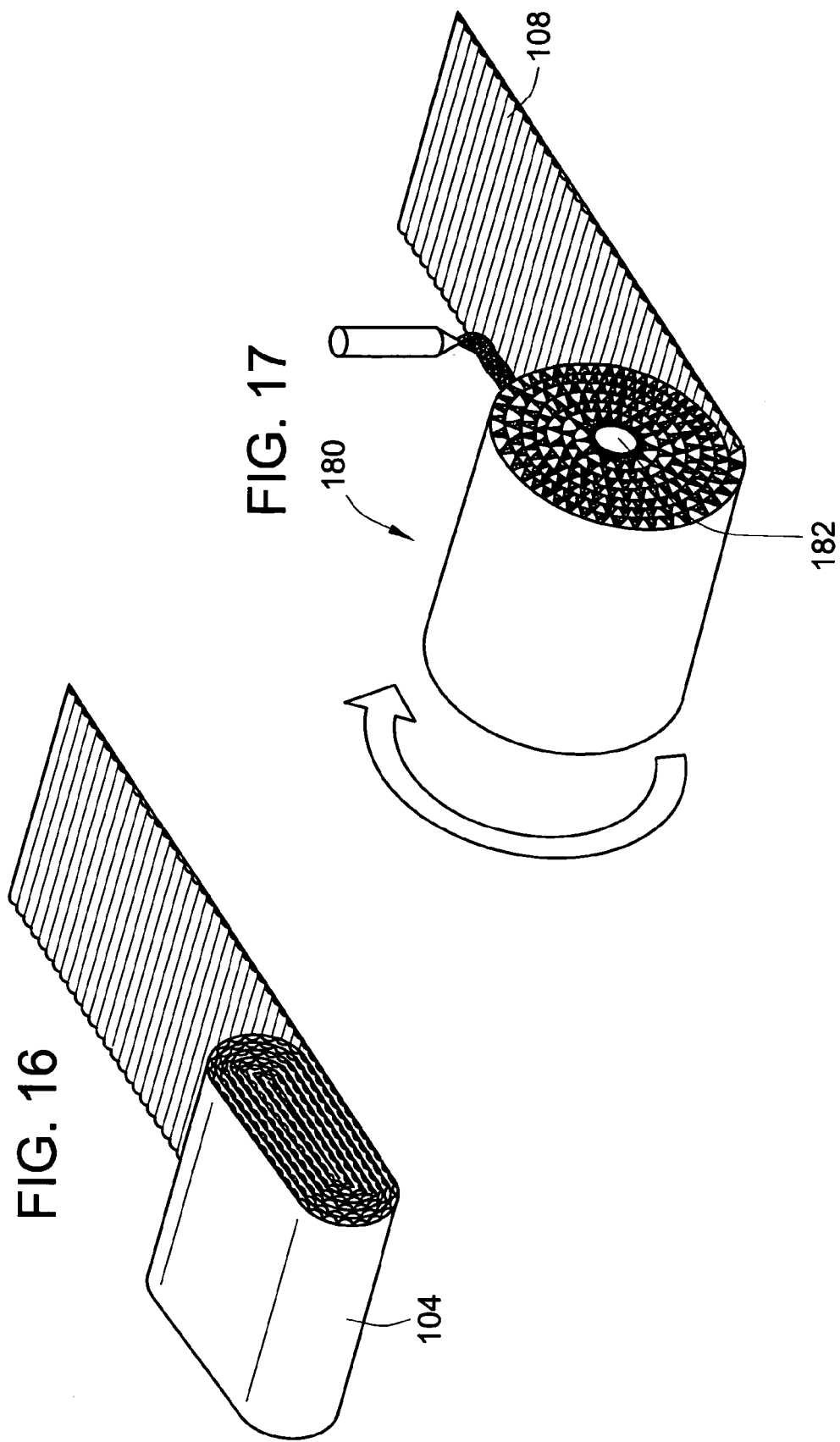

METHOD AND APPARATUS FOR WINDING A FILTER MEDIA PACK

CROSS-REFERENCE TO RELATED PATENT APPLICATIONS

This patent application is a continuation-in-part of U.S. patent application Ser. No. 10/979,987, filed Nov. 3, 2004, now U.S. Pat. No. 7,255,300, the disclosure and teachings of which are incorporated herein, in their entireties, by reference.

FIELD OF THE INVENTION

This invention relates to fluid filters for removing particulate matter from a flow of fluid in liquid or gaseous form, including filters of the type used for filtering inlet air supplied to machinery such as engines and compressors, and more particularly to an apparatus and method for winding a filter media pack for use in such filters.

BACKGROUND OF THE INVENTION

Filters of the type used for filtering particulate matter from engine intake air sometimes include one or more layers of a porous filter material that is formed into a convoluted pattern, often referred to in the industry as fluted filter media. The fluted filter media sometimes also includes one or more additional layers of non-corrugated material attached to the convoluted filter material. These additional sheets are known by various names, such as face sheets, or backing sheets, and may be formed from either porous or non-porous material.

In one commonly used form of filter element, a length of the fluted filter media is wound about an axis into a coiled shape to form a media pack having one axial end adapted for receiving a flow of fluid and the other axial end adapted for discharging the fluid after it is filtered by the fluted filter media forming the media pack. After formation of the coiled media pack, secondary operations may be performed, to add seals or mounting provisions to the media pack, to form a filter element that can be inserted into a filter housing that directs a flow of fluid through the filter element.

As part of the process of forming a coiled filter pack for a filter element, a number of operations have typically been performed, such as trimming the fluted filter media to form a leading edge of the media, attaching the leading edge to a mandrel used for winding the coiled filter pack, feeding a predetermined length of the media to the mandrel during winding, trimming the media a second time to form a trailing edge of the media, securing the trailing edge to the filter pack, and applying adhesives or sealants to portions of the media as it is wound into a coil. In forming the leading and trailing edges, it is desirable to trim the media directly through a peak of the convolutions forming the fluted media, to thereby form a half-peak at the leading and trailing edges that can be filled with an adhesive or sealant. It is also desirable to control the tension on the media during winding to ensure that the flutes of the underlying layers are not crushed in the process of winding the subsequent layers, and to provide uniformity in the final shape and size of the coiled media pack.

Because the filter element incorporating the media pack is generally disposable, and because there are typically multiple sources from whom a consumer may purchase replacement filter elements, it is desirable to automate the process of winding the media pack, so that the manufacturing cost and selling price of the filter element can be minimized. Prior approaches to automating the process of winding such media packs have not been entirely satisfactory, however, particularly where the media pack has a cross-section that is other than round, such as square, rectangular, oval, or race-track shaped with a rectangular central section joining rounded ends. Herein, rectangular or partially rectangular, oval, race-tracked and other non-circular shapes may be referred to as either "oblong" or "elongated". "Elongated" and "oblong" are meant to mean the same thing.

In general, prior approaches have relied upon undesirably complex conveyor mechanisms and machinery for performing some of the required operations, and have not been capable of providing many of the desired operations in an automated form. As a result, some operations, such as trimming the media to length have had to be performed by hand, which heretofore precluded fully taking advantage of manufacturing opportunities such as feeding the media from a large master roll of the media. Prior approaches have also not allowed for adequate control of the tension in the media during winding.

It is desirable, therefore, to provide an improved apparatus and method for forming a filter media pack by winding a fluted filter media into a coil. Also, improved tooling for winding elongated filter is also desirable.

BRIEF SUMMARY OF THE INVENTION

Part of the disclosure and some of the claims may be directed toward new tooling and/or winding methods or machinery for forming fluted filters. According to one of the inventive aspects disclosed herein, tooling can be used to define an internal major axis of the elongated fluted filters. As a result, cores or winding boards, while still an optional component, are not necessary and coreless assembly can be accomplished if desired. Further, winding of the media using such tooling may result in the desired shape to avoid for example the serious media deformations of material experienced in the prior art (see e.g. WO 2004/082795 requiring shape deformation from round to racetrack). For example, embodiments of the present invention can be used to roll the desired elongated media shape without deforming media from round to oblong.

Another different inventive aspect pertains to winding the oblong media at differing speeds depending upon the position of the elongated media. For example, the media may be wound more quickly when the major axis is generally parallel to the fed media.

Another inventive aspect relates to apparatus for controlling the tension on the media being fed into the roll and/or the tension on the roll during winding. This can be used for shaping. Additionally, fixtures may be employed to set and hold and optionally compress the media. For example, winding of the filter can result in the desired oblong shape. To maintain the desired oblong shape obtained from winding and prevent unwinding or unraveling, fixtures can be employed. Such fixtures can also be set to correspond to application shape and/or frame shape and thereby increase the propensity for a proper fit between the wound filter media and a corresponding frame.

An aspect and/or advantage that can be realized through disclosed embodiments is that the same machinery used for winding round media arrangements may also be used for oblong media arrangements. According to this aspect, different tooling may be swapped to facilitate winding of different shapes of media.

One of the embodiments of the invention may provide an improved method and apparatus for forming a filter element including a media pack in the form of a coiled web of fluted filter media, by feeding the web of fluted filter media at a controlled linear speed onto a mandrel rotated by a winding motor providing a controlled driving torque to the mandrel, to thereby maintain a controlled tension on the web of fluted filter media as the web is wound onto the mandrel. The web of filter material may be fed at a substantially constant linear speed to the mandrel, and/or the winding motor may be controlled in a manner providing variable driving torque to the mandrel for maintaining a constant tension on the web as a function of the constant driving torque. The invention may be used for forming coiled media packs having circular or non-circular cross sections, and coiled media packs that are coreless or coiled media packs that are wound around a central core.

Another embodiment of the invention may allow the mandrel to rotate at varying rotational speeds to facilitate maintaining a constant web tension. This is particularly advantageous when winding a non-circular coiled web of fluted filter media onto the mandrel, because complex transport structures, such as the conveyors required in prior methods and apparatuses, are not required, and because tension in the web can be accurately controlled during winding.

An apparatus or method according to an embodiment of the invention may also include provisions for accurately feeding a pre-determined length of the web of media to the mandrel during winding, and provisions for positioning the web with respect to a cutter for severing the web through one of the peaks of the fluted media, to thereby form a half-peak that can be readily filled with an adhesive/sealant. The half-peaks may be provided at the leading and/or trailing edges of the web. According to one aspect to the invention, the trailing edge of the web for one filter pack may be formed simultaneously with the leading edge of the next filter pack to be wound, by the operation of severing the web through one of the peaks.

An apparatus or method according to an embodiment of the invention may also include a movable web guide apparatus for guiding the web into alignment with the mandrel, and/or an applicator for applying a bead of adhesive/sealant to the web during winding. According to an aspect of the invention, the web guide is movable away from the mandrel, after attachment of the web to the mandrel, to provide clearance for rotation of the mandrel and filter pack being wound on the mandrel.

An apparatus or method according to an embodiment of the invention may include an AC vector motor, operating in a torque mode, as a winding motor providing torque to the mandrel, and/or a web feeder having a cogged roller attached thereto for driving the web of media. The web feeder may include an encoder for use in accurately positioning the web along the feed path, to facilitate severing and adhesive application operations, and for determining when a predetermined length of the web has been fed to the mandrel.

Other aspects, objectives and advantages of the invention will be apparent from the following detailed description and the accompanying drawings. It is to be noted that any inventive aspect set forth herein may be used by itself or in conjunction with other inventive aspects.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 14 is a top view of a mandrel and web guide arms of the apparatus of FIG. 1, according to the invention.

FIG. 16 is a perspective view of a core-less media pack, having a non-circular cross section, as formed by the apparatus of FIG. 1, according to the invention, in the manner illustrated in FIGS. 2-10.

FIG. 17 is a perspective view of an exemplary representation of a media pack, having a circular cross-section and wound around a central core, which can be formed by the winding apparatus of FIG. 1.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 15:
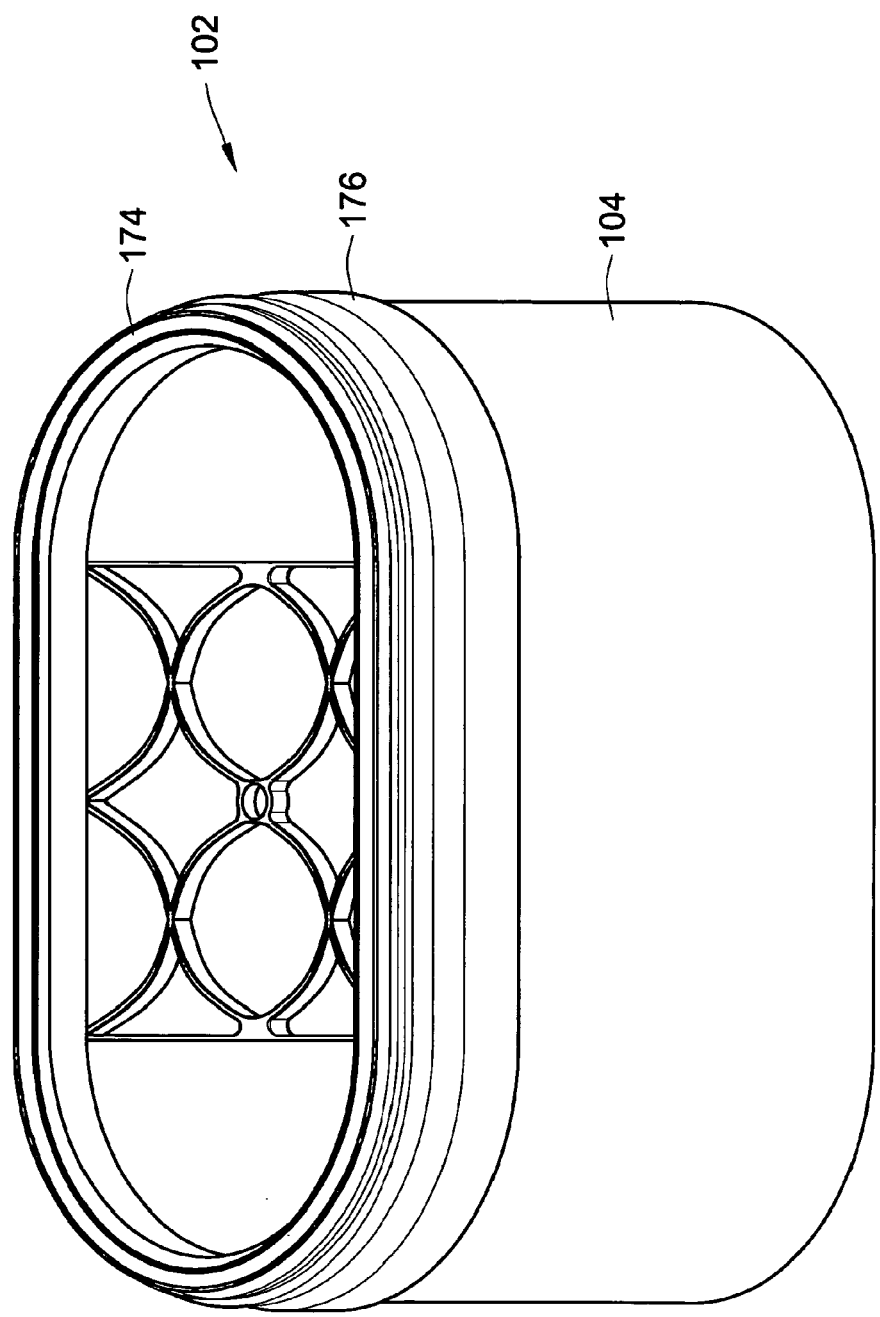
FIG. 15 is a perspective view of a filter element including a media pack, as wound by the apparatus of FIG. 1, according to the invention, in the manner illustrated in FIGS. 2-10.

FIGS. 1-14 show various structural and operational aspects of an exemplary embodiment of the invention in the form of a winding apparatus 100 for forming a filter element 102, as shown in FIG. 15, including a filter pack 104, as shown in FIG. 16, in the form of a coiled web 106 of fluted filter media 108. As will be understood from the following description, the winding apparatus 100 of the exemplary embodiment performs a number of functions in addition to simply winding the web 106 of fluted filter material onto the mandrel 112. The term winding apparatus is used herein to aid in the description of an apparatus and method according to the invention, and is not intended to be limiting with respect to practicing the invention.

Figure 11:
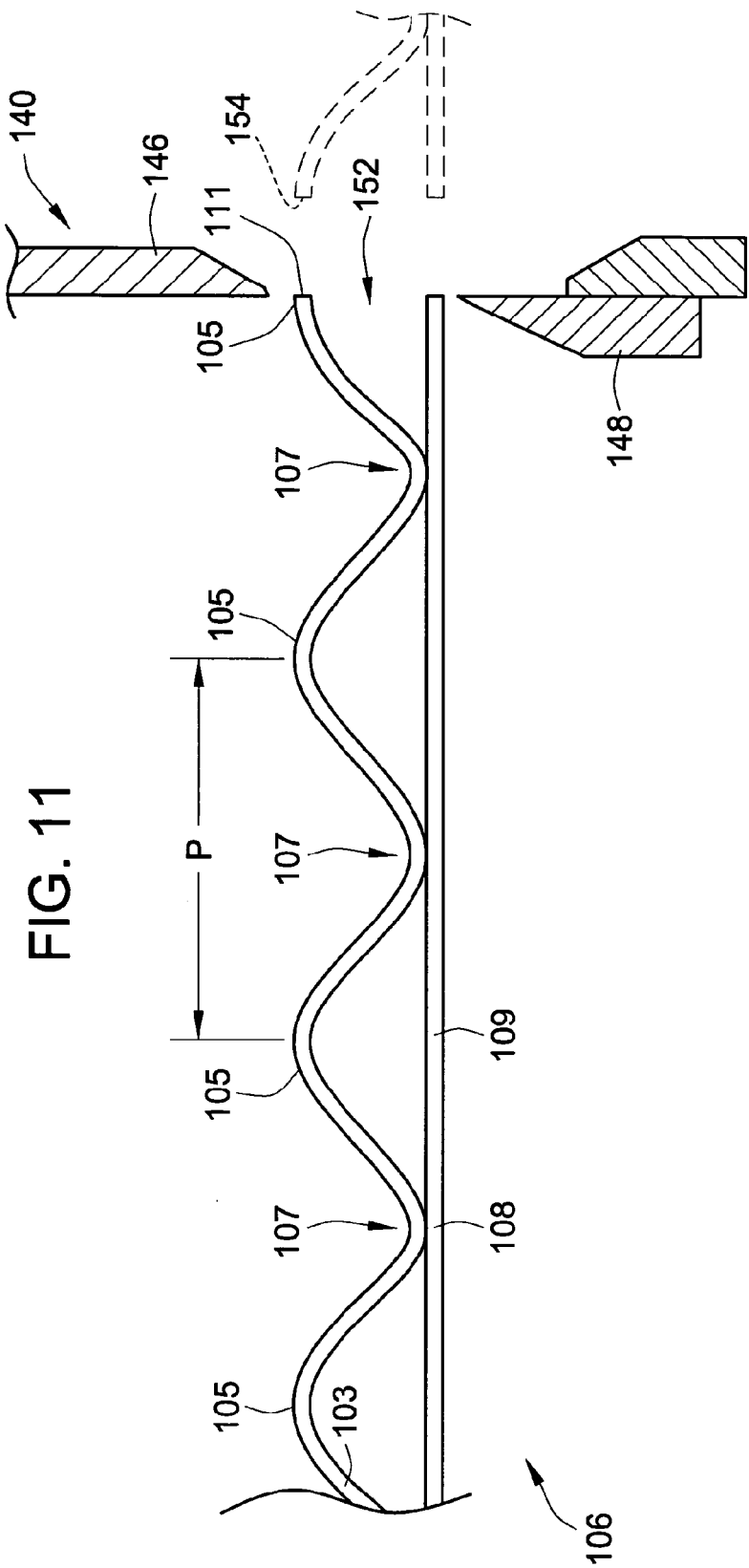
FIGS. 11 and 12 are enlarged views showing features of a web of fluted filter material, used in conjunction with FIGS. 2-10, for illustrating operation of the apparatus of FIG. 1.
Figure 12:
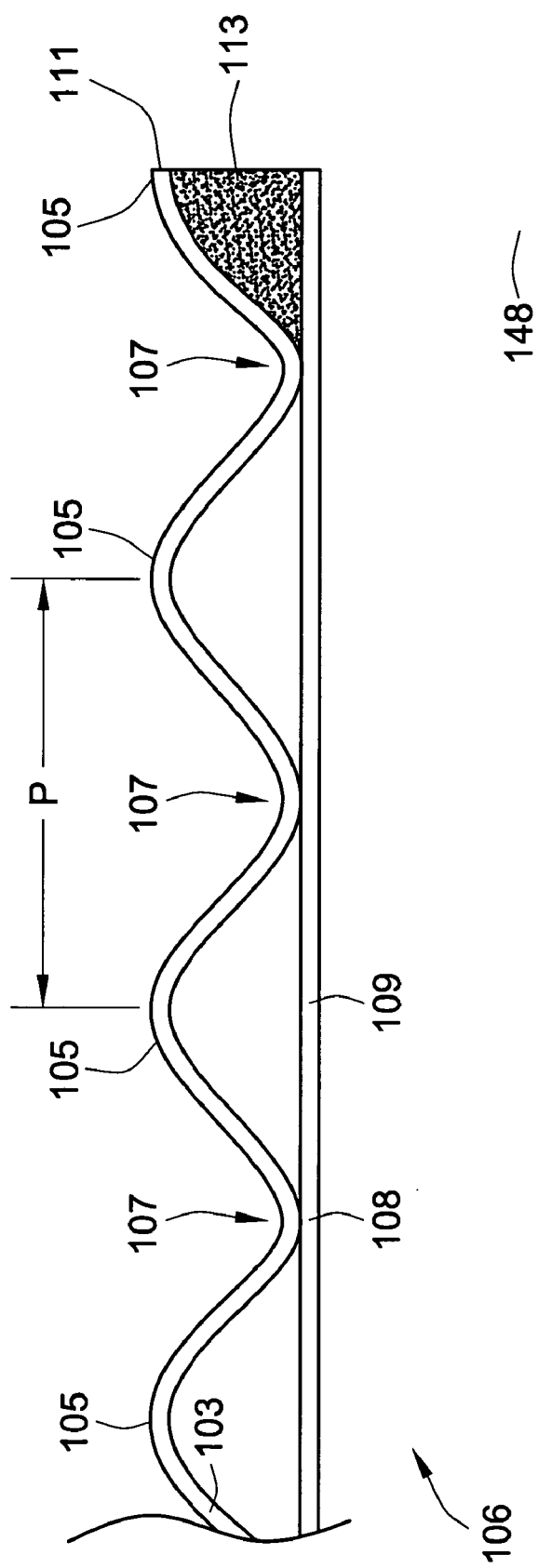
Figure 13:
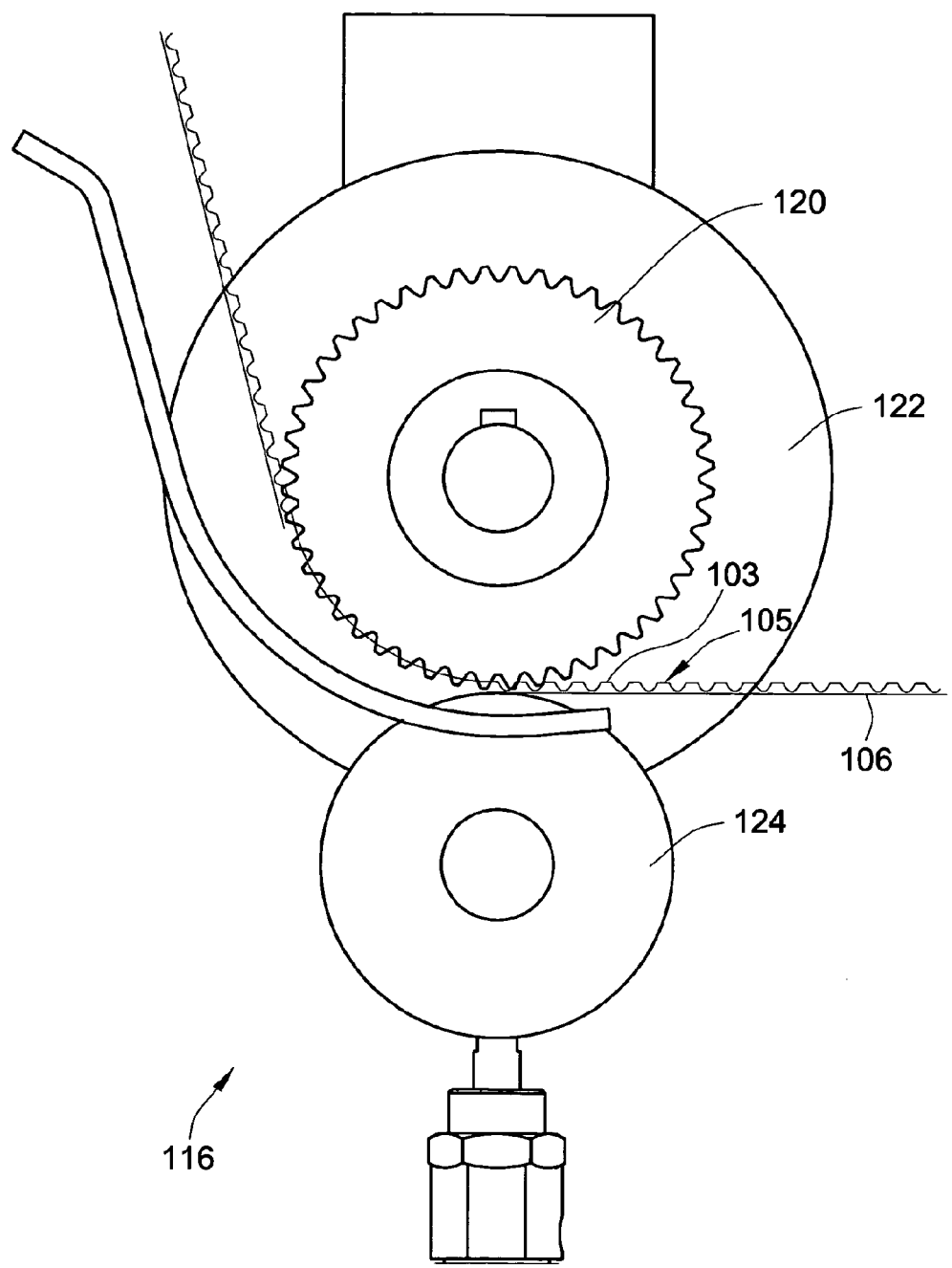
FIG. 13 is an enlarged view of a portion of a web feeder of the apparatus of FIG. 1, according to the invention.

As will be understood from the following description, the invention may be used for winding filter packs having non-circular cross sections, such as the race-track shaped filter pack 104 shown in FIG. 16, or filter packs 110 having circular cross sections, as shown in FIG. 17. As shown in FIGS. 11 and 12, the fluted filter media 108, used herein for describing the exemplary embodiment of the invention, includes a convoluted sheet 103 of porous filter material forming peaks 105 and valleys 107, attached to a face sheet 109 of porous filter material, with adjacent peaks 105 being regularly spaced from one another at a pitch 'P' of the web 106. As will be understood by those having skill in the art, the invention may also be used with other types of filter media, in other embodiments of the invention. The convoluted sheet 103 may be formed by any appropriate process, such as corrugating or pleating, but preferably by gathering, as described in a U.S. patent application Ser. No. 10/979,390, entitled "Gathered Filter Media and Method of Making Same," assigned to the Assignee of the present invention, and incorporated herein by reference.

As shown in FIGS. 1-10, the winding apparatus 100 includes a mandrel 112, mounted for rotation about an axis 114 of the mandrel 112, a web feeder 116 for feeding the web 106 of fluted filter media 108 at a controlled linear speed, onto the mandrel 112, and a winding motor 118 operatively connected to the mandrel 112 for providing a controlled driving torque to the mandrel 112, to thereby maintain a controlled tension on the web 106 of fluted filter media as the web 106 is wound onto the mandrel 112. In the exemplary embodiment, the winding motor 118 is an AC vector motor, operating in a torque mode.

As shown in FIGS. 2-10 and 13, the web drive 116, of the exemplary embodiment, includes cogged drive roller 120, having an outer periphery formed to engage the peaks and valleys 105, 107 of the web 106, driven by a web drive motor 122. The web drive 116 also includes a pinch roller 124, for holding the web 106 in engagement with the cogged drive roller 120, an idle roller 126 and a master roll support apparatus 128. The master roll support apparatus 128 of the exemplary embodiment is configured for mounting a large master roll 130 of the web 106 of filter media about a master roll axis 132, so that the web drive 116 can continuously feed the web 106 to the mandrel 112, along a feed direction 134 of the winding apparatus 100.

The idle roller 126 is disposed between the master roll 130 and the cogged drive roller 120, in a position which causes the web 106 of fluted filter media to wrap partially around the periphery of the cogged drive roller 120 in a manner that helps to keep the peaks and valleys 105, 107 of the web 106 drivingly engaged with the cogged drive roller 120, so that the web drive motor 122 can drive the web 106 forward and backward along the feed path 134. The pinch roller 124 is mounted in such a way that a pinch roller actuator 136, in the form of a device such as a pneumatic or hydraulic cylinder, or an electric motor driven ball screw, for example, can move the pinch roller 124 out of engagement with the web 106 to facilitate feeding the web 106 past the cogged drive roller 120, when the web is being initially loaded into the winding apparatus 100.

The web drive motor 122 of the exemplary embodiment is an electric motor having an encoder that allows precise rotational positioning of the cogged drive roller 120, and the ability to precisely monitor the length of web 106 which has been fed in either direction along the feed path 134, toward or away from the mandrel 112. In other embodiments of the invention, however, other types of motors or drive mechanisms, allowing positioning and monitoring of length, may alternatively be used in practicing the invention.

It will be understood by those having skill in the art, that in other embodiments of the invention, a web drive may differ considerably from the web drive 116 of the exemplary embodiment. It is further understood that, although the exemplary embodiment includes provisions for utilizing a large master roll 130 of the fluted filter media 108, to allow continuous feeding of the web 106, the invention may also be practiced, in other embodiments, with smaller master rolls, or with pre-cut lengths of the web 106.

The winding apparatus 100 of the exemplary embodiment also includes a cutter 140, an applicator 142, and a movable web guide apparatus 144, all disposed between the cogged drive wheel 122 and the mandrel 112. The applicator 142 is used for applying a bead of adhesive/sealant 143 to the web 106, during winding of the coiled web 106, in a manner shown in FIGS. 5 and 6, and described in more detail below. The term adhesive/sealant, as used herein, is intended to be inclusive rather than limiting, and includes any material that is applied through the applicator for purposes such as structurally bonding together the layers of a filter pack, or for providing a complete or partial seal against the flow of fluid through a filter pack according to the invention.

The cutter 140, of the exemplary embodiment, includes a pair of jaws 146, 148 operatively connected to be driven by a cutter actuator 150, for severing the web 106 a first and a second time to form leading and trailing edges respectively of the web 106. The jaws 146, 148 of the cutter 140 are disposed along the feed path 134 at a known distance from the web drive motor 122, so that the web drive motor 122 can position a first peak 105 of the web 106 under the cutter 140, in such a manner that the cutter 140 will sever the web through a first one of the peaks 105, to form the a leading edge 152 of the web 106, as shown in FIG. 11, and in similar fashion, through a second one of the peaks 105 to form the trailing edge 154 of the web 106. Severing the web 106 through the peaks 105 in forming the leading an trailing edges 152, 154 is desirable, because the half-peak 111 that is created when the web 106 is severed on one of the peaks 105 can be filled with an adhesive/ sealant 113, as shown in FIG. 12, in a manner known in the art, for the purposes of precluding fluid leakage through the half-peak 111, and securing the leading and trailing edges 152, 154 of the coiled web 106 within the filter pack 104.

Those skilled in the art will recognize that, by virtue of the arrangement described above, the web 106 may be severed a first time, on one of the peaks 105, and then the web drive motor 122 can feed out a length of web 106 that is equal to an integer multiple of the pitch P of the web 106, along the feed path 134 toward the mandrel 112, to position a second peak 105 directly under the cutter jaws 146, 148, so that the web 106 may be severed a second time, directly through the second peak 105, to form the trailing edge 154 of the web 106.

In other embodiments of the invention, other types of cutters, such as water jets, saws, lasers, etc. can be used in place of the shear-type cutter shown and described herein with respect to the exemplary embodiment of the winding apparatus 100.

The applicator 142 is preferably located between the cutter 140 and the mandrel 112 spaced an slightly beyond an over-travel distance 'D' from the cutter 140, to preclude fouling of the cutter 140 with adhesive/sealant dispensed by the applicator 142 during winding of the filter pack 104. As described in greater detail below, in the exemplary embodiment of the winding apparatus 100, the web drive motor 122 draws the web 106 back past the cutter 140 a distance equal to the over-travel distance D, prior to severing the web 106 the second time to form the trailing edge 154 of the web 106, so that the adhesive/sealant 143 on the web 106 extends virtually from the leading edge 152 to the trailing edge 154 of the coiled web 106. As the web 106 is drawn back the over-travel distance D, the flow of adhesive/sealant 143 through the applicator 142 is preferably stopped, or redirected to a different area of the web 106, so that the bead 143 of adhesive/sealant does not become excessive as the web 106 moves, first forward, and then backward, along the feed path 134. In some embodiments, it may be desirable to have the over-feed distance D be equal to an integer multiple of the pitch P of the web 106.

The web guide web guide 144 includes a pair of arms 156, 158 that are selectively rotated, by a pair of web guide actuators 160, 162, into and out of adjacency with the feed path 134, as described in greater detail below, at a point between the cutter 140 and the mandrel 112, for guiding the leading edge 152 and an adjacent initial length of the web 106 to the mandrel 112, after the first cut is made to sever the web 106, to form the leading edge 152, and after the open half-peak 111 at the leading edge 152 has been filled with adhesive/sealant 113.

As shown in FIG. 14, the mandrel 112 of the exemplary embodiment includes two side plates 166, 168 that are operatively connected to be driven in unison about the axis 114 of the mandrel. Aligned channels 170, 172 are attached to each of the side plates 166, 168 for receiving a portion of the opposing longitudinal edges of the web 106 adjacent the leading edge 152 to secure the leading edge 152 of the web 106 to the mandrel 112. The portion of the web 106 held by its longitudinal edges also forms an initial layer of media over which subsequent layers are wound to form a "coreless" race-track shaped filter pack 104, as shown in FIG. 16. As also shown in FIG. 14, the exemplary embodiment includes two sets of web guide arms 156, 158, with one set operatively mounted respectively adjacent each of the side plates 166, 168.

The winding apparatus 100 also includes a controller 164, operatively connected, as shown by dashed lines in FIGS. 1-10, to the winder motor 118, the web drive motor 122, the cutter actuator 150, the pinch roller actuator 136, the applicator 142, and the actuators 160, 162 for the web guide arms 156, 158, for controlling the various component parts of the winding apparatus 100. The actuators 160, 162 may be provided in many forms, such as a pneumatic or hydraulic cylinder, or an electric motor driven ball screw.

Operation and additional structural features of the winding apparatus 100 will be described, as follows, with reference to FIGS. 2-14, illustrating a sequence of operations related to forming a filter pack 104, having a non-circular cross-section.

Figure 1:
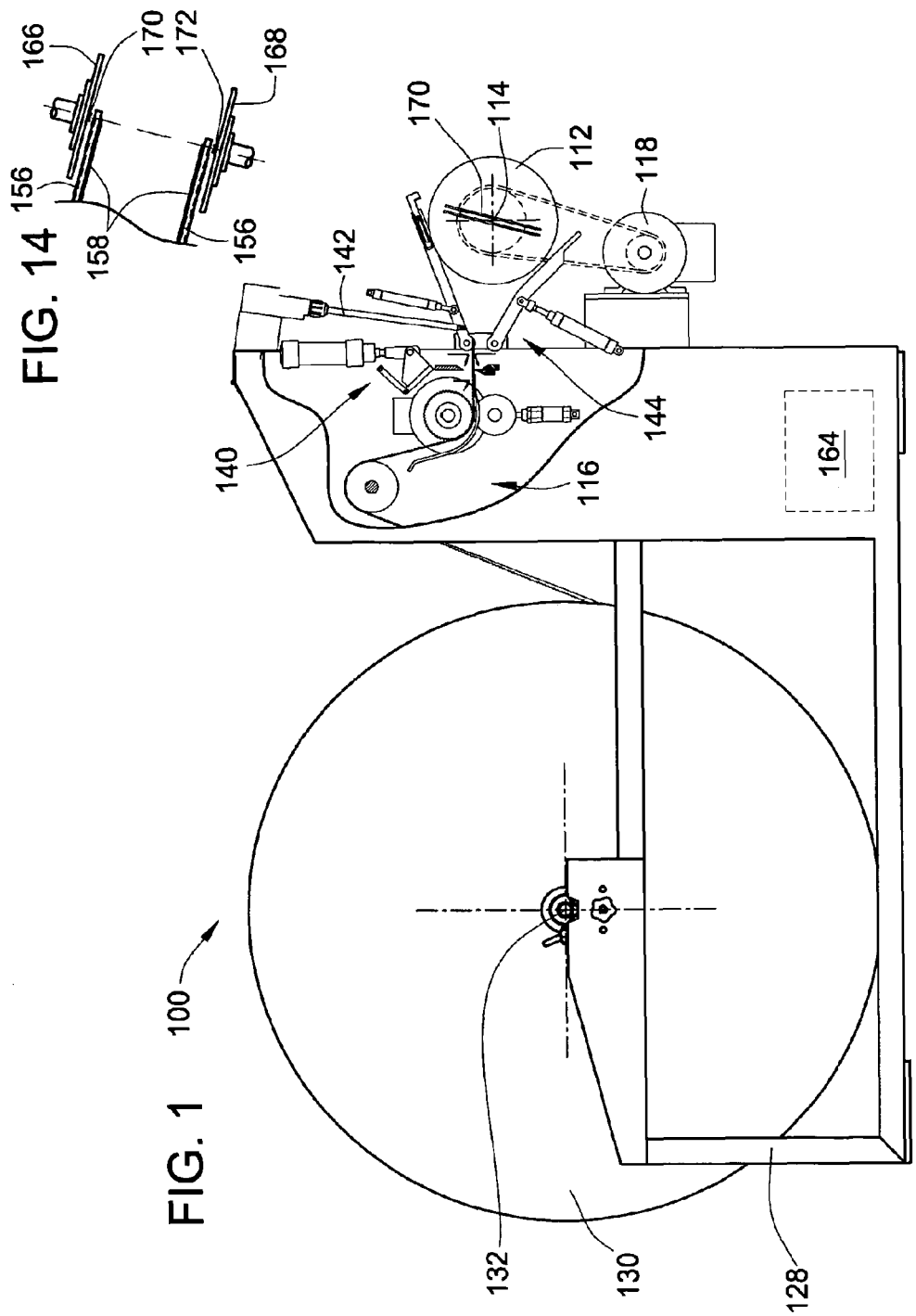
FIG. 1 is partial cutaway view of an exemplary winding apparatus, according to an embodiment of the invention.
Figure 2:
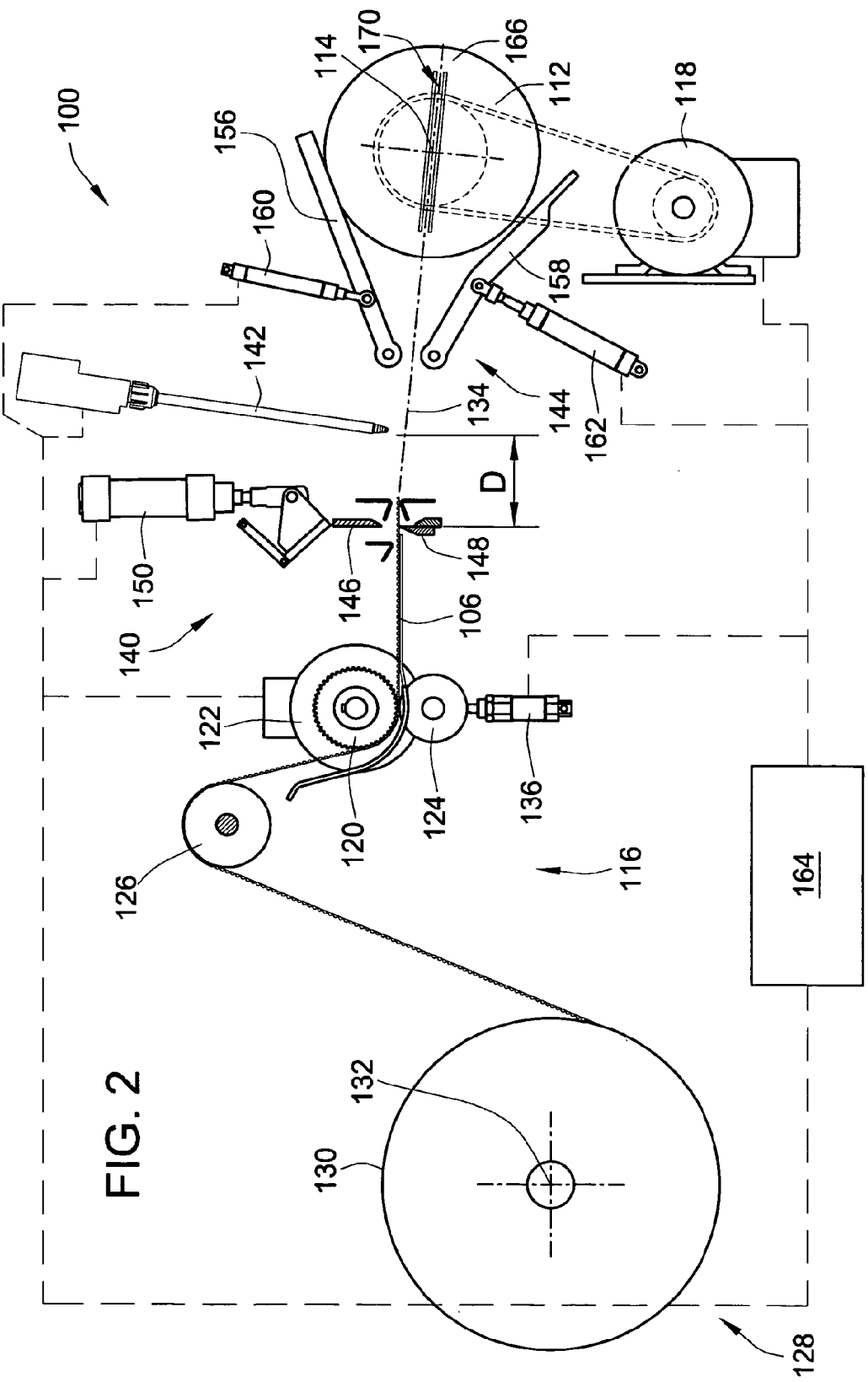
FIGS. 2-10 are schematic views of the winding apparatus of FIG. 1, illustrating various structural and operational aspects of an embodiment of the invention.

As shown in FIG. 2, with the web guide arms 156, 158 located in an open position, after loading the master roll 130 of fluted filter media into the master roll support apparatus 128, for rotation about the master roll axis, 132, the web 106 is fed over the idler roller 126, between the cogged roller 120 and the pinch roller 124 and through the cutter 140. The web 106 is jogged into a position where a first one of the peaks 105 is positioned under the cutter 140, to thereby initialize the positioning of the web 106, and the cutter 140 is actuated to sever the web 106 a first time through the first peak 105, as shown in FIGS. 3 and 11, to form the leading edge 152 of the web 106.

Figure 3:
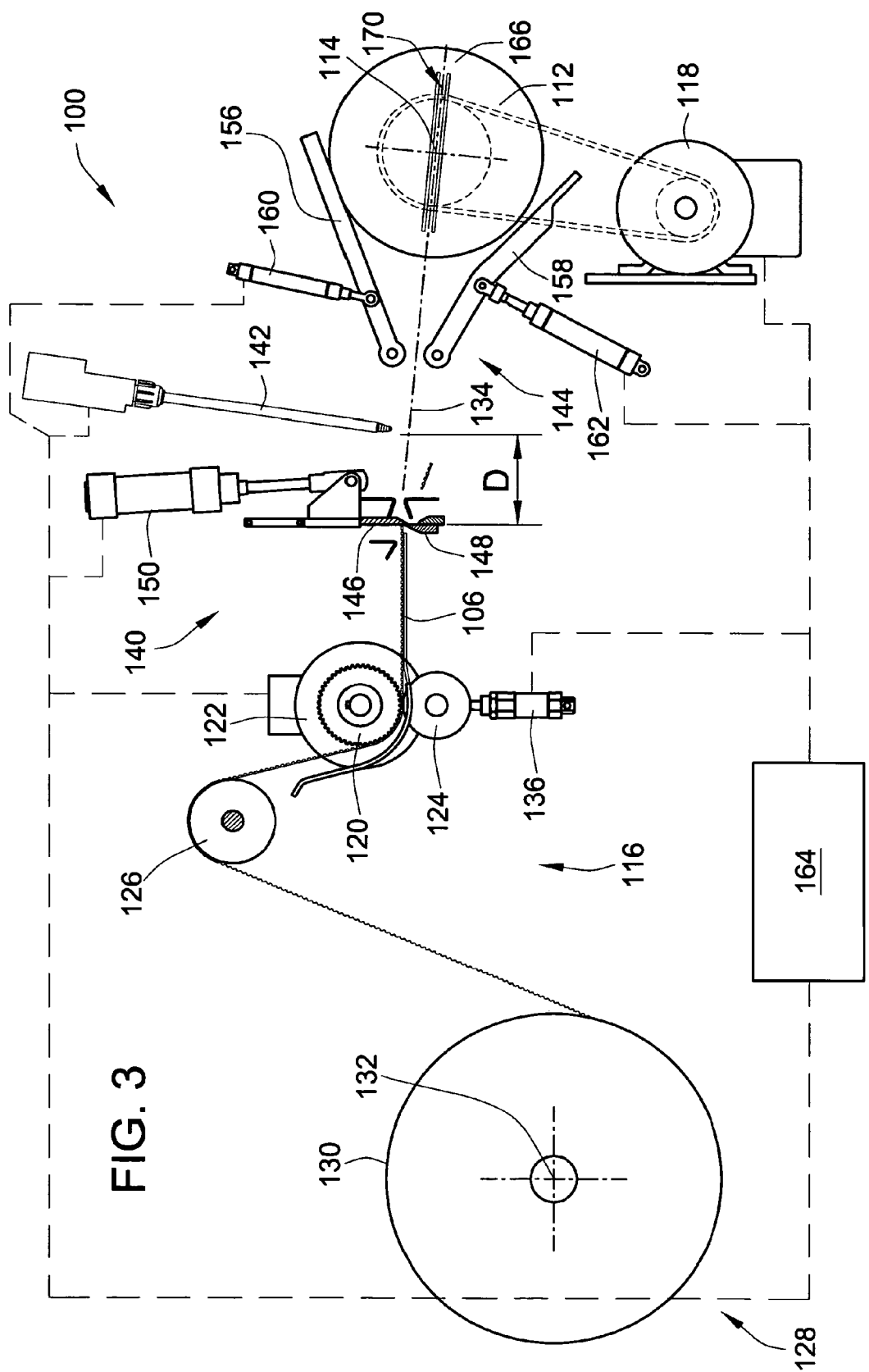
Figure 4:
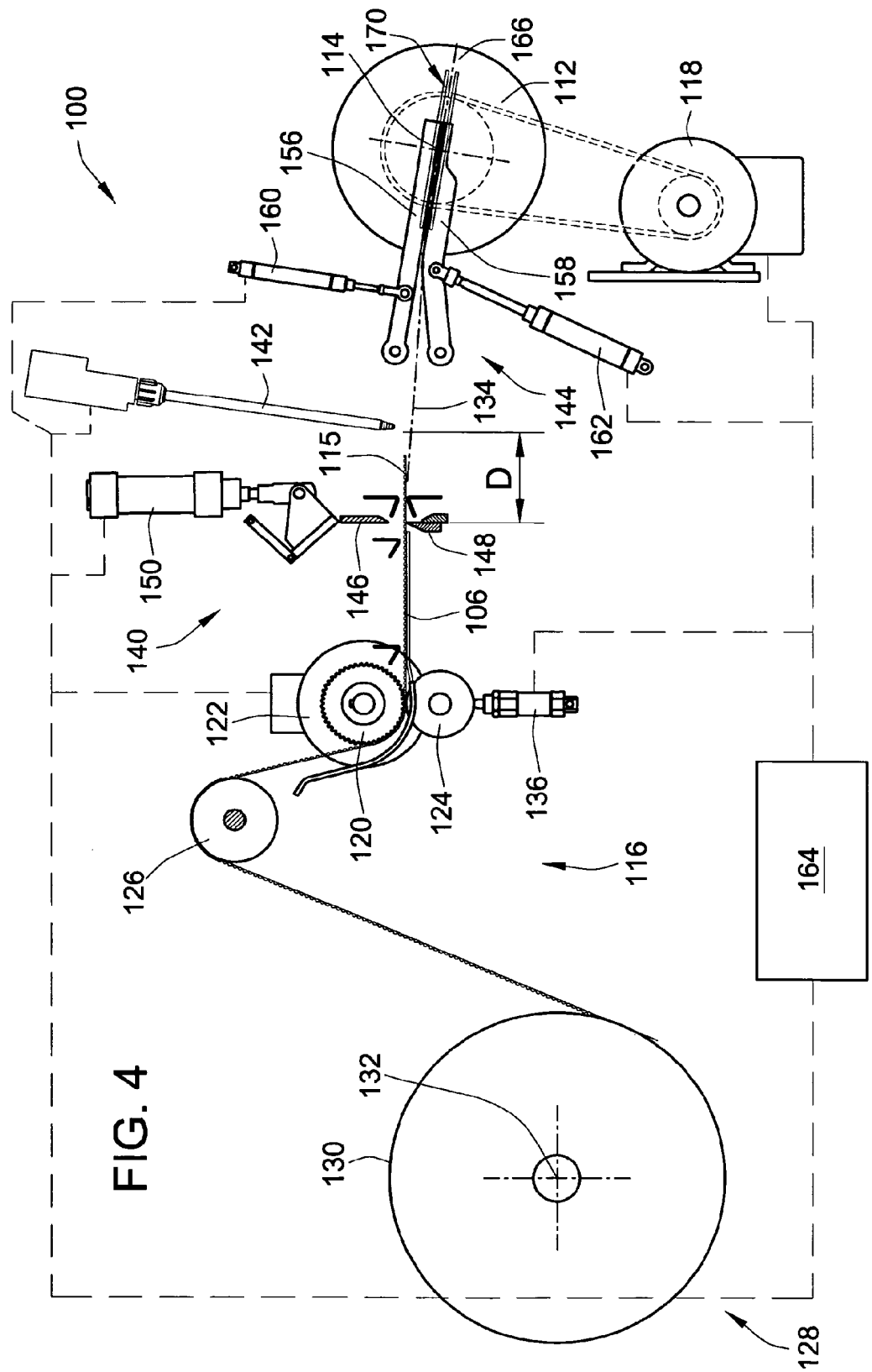

As shown in FIG. 3, the web drive 126 then advances a pre-wind length 115 of web 106 past the cutter 140, for application of an adhesive/sealant 113 in the half-peak 111 forming the leading edge 152 of the web 106. The adhesive/sealant 113 can be applied into the half-peak 111 by any known method, including having an operator of the winding apparatus 100 use a hand-held applicator to fill the half-peak 111 with an adhesive/sealant material such as a urethane material or a hot-melt glue.

Figure 5:
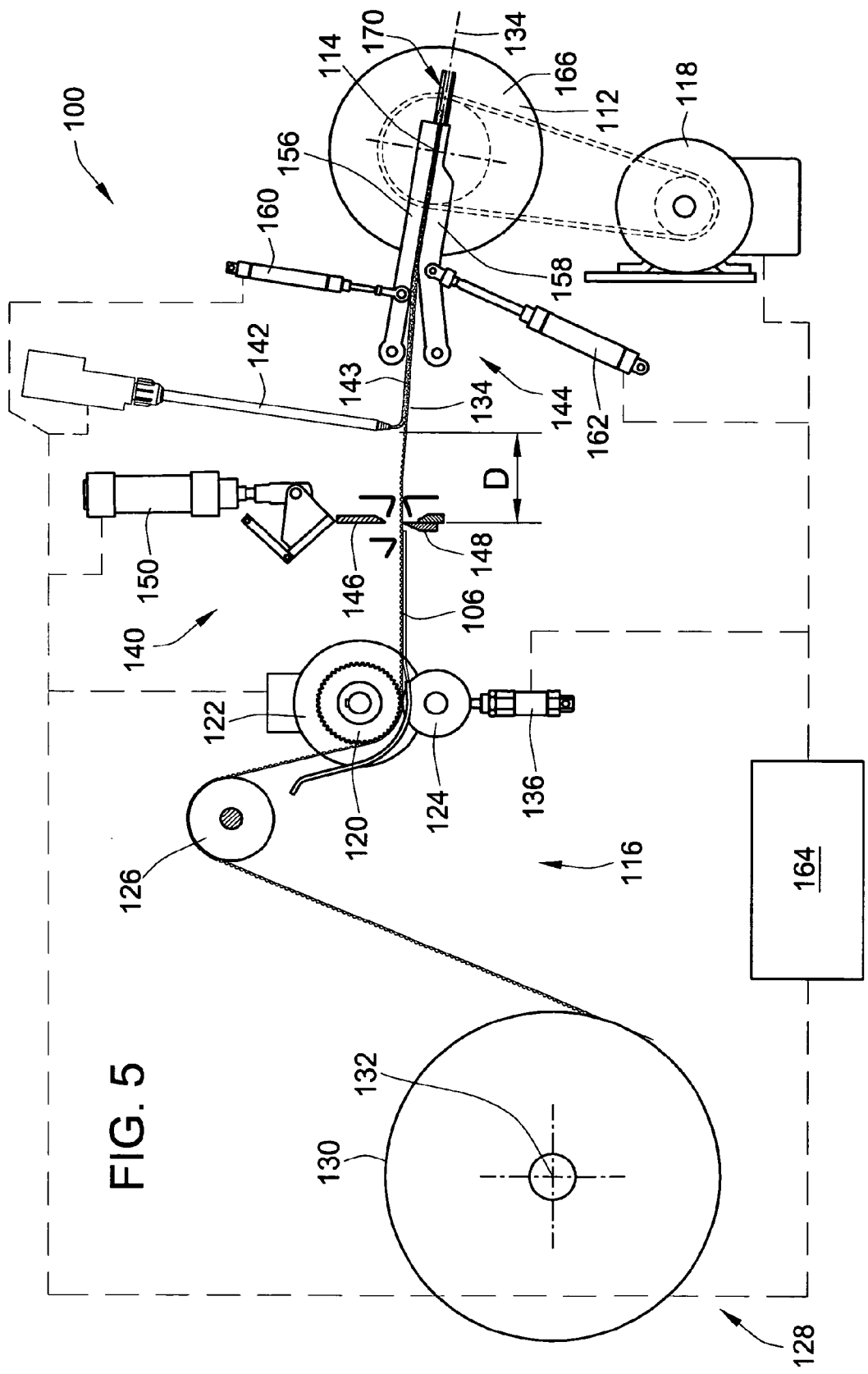

Next, as shown in FIG. 5, the mandrel 112 is rotated to an initial position in which a channels 170, 172 of the mandrel 112 are generally aligned with the feed path 134, the web guide arms 156, 158 are moved to a closed position, and the web feeder 116 feeds an initial length of the web 106 through the web guide arms 156, 158, and into the channels 170, 172 in the mandrel 112. The channels 170, 172 of the mandrel 112 receive the leading edge 152 of the web and a portion of the longitudinal edges of the web 106, adjacent the leading edge 152. As the web is fed into position in the channels 170, 172 in the mandrel 112, the applicator 142 applies a bead 143 of adhesive sealant to the upper face (as shown) of the web 106, at a point spaced far enough laterally inward from the longitudinal edge of the web 106, that the adhesive/sealant 143 will not spread into the channels 170, 172 in the mandrel 112 as the filter pack 104 is wound on the mandrel 112.

Figure 6:
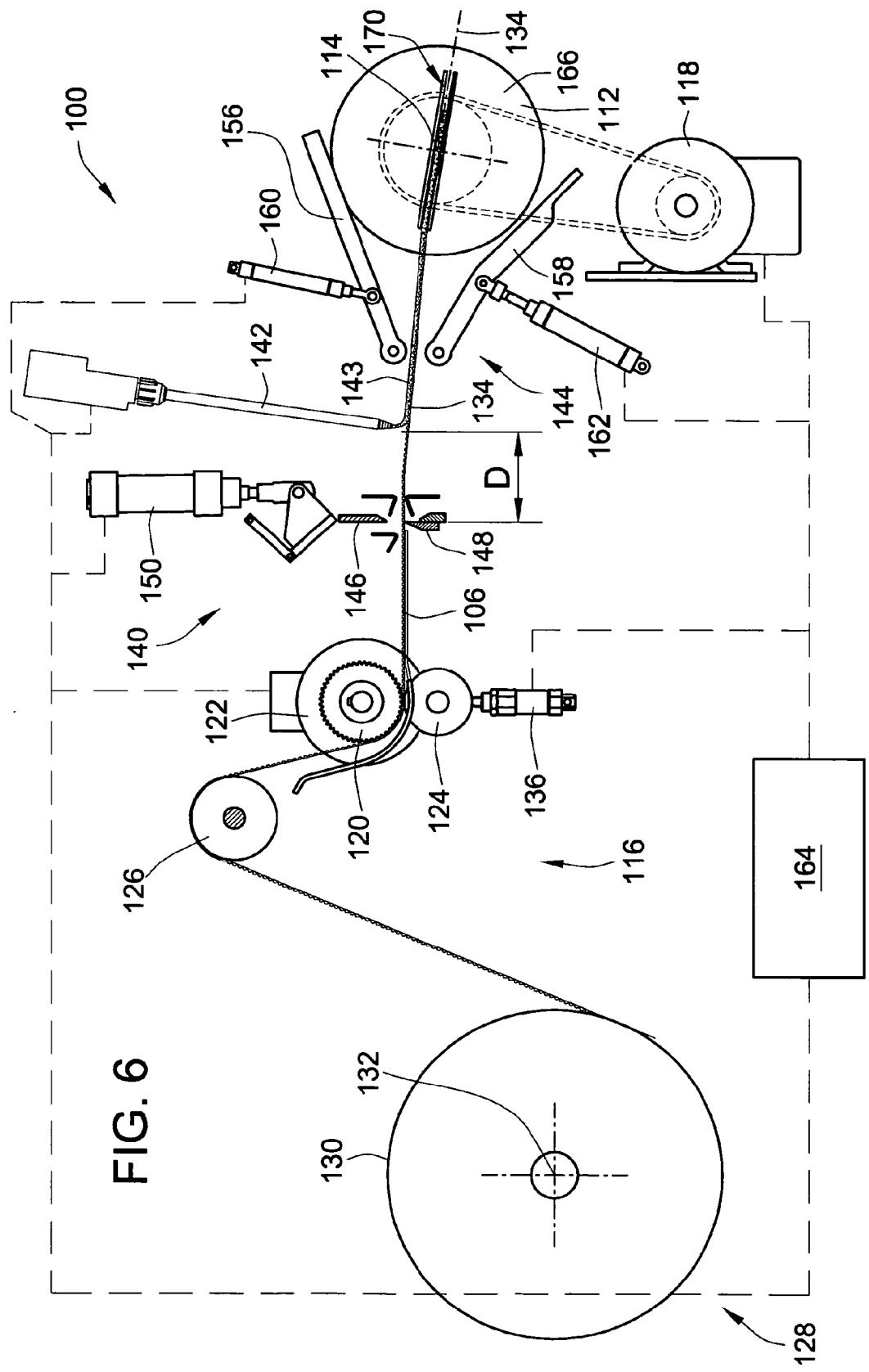
Figure 7:
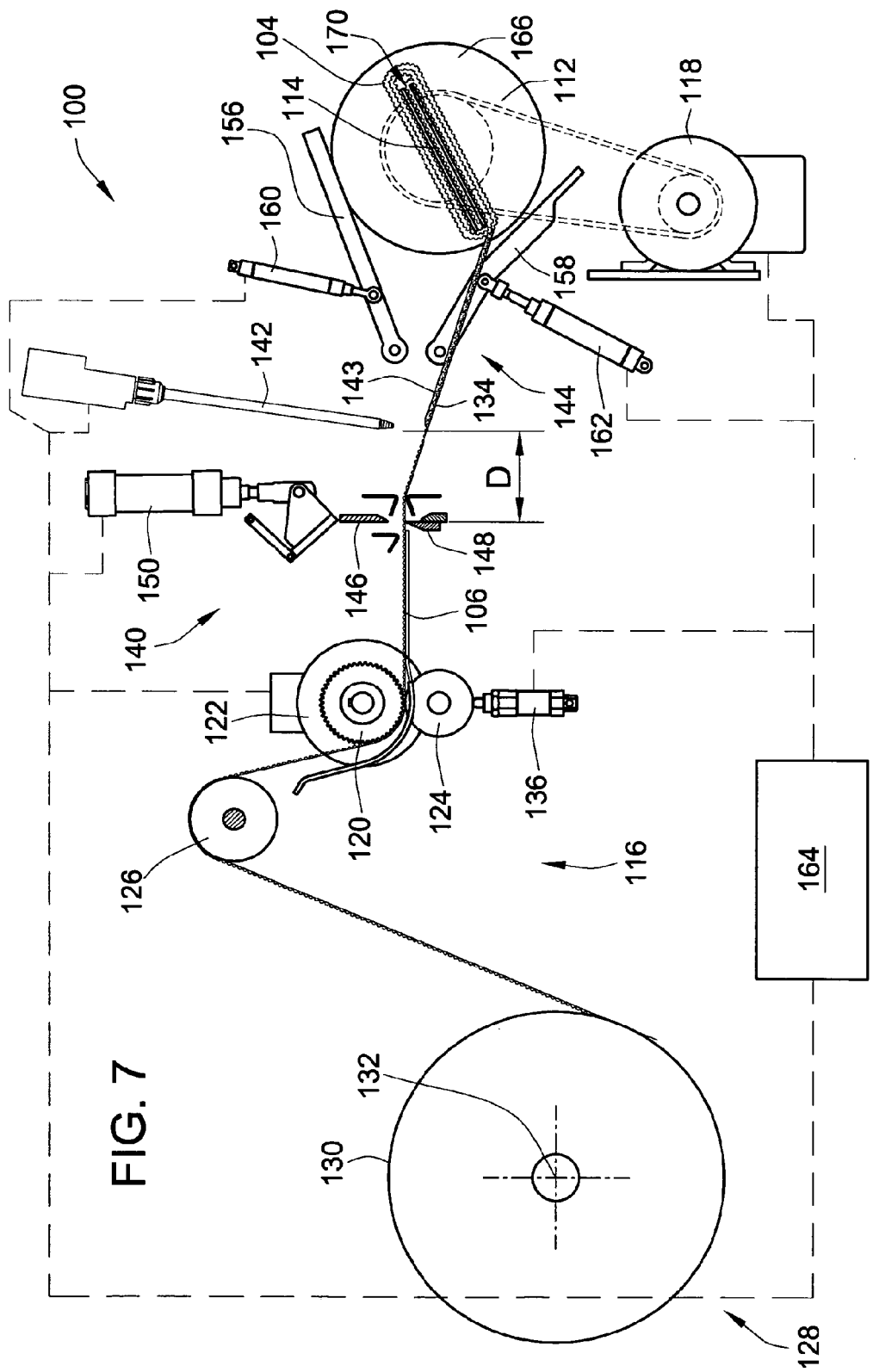

The web guide arms 156, 158 are then moved to the open position, as shown in FIG. 6, and the web drive motor 122 and winding motor 118 are energized to wind the filter pack 104, as shown in FIG. 7. During winding, the web drive motor 122 feeds out a predetermined length of web 106, including an over-travel distance D, as shown in FIG. 7.

During winding, the web drive motor 122 is controlled during winding for feeding the web 106 of fluted filter media at a controlled linear speed onto the mandrel 112, and the winding motor 118 is controlled to provide a controlled driving torque to the mandrel 112, to thereby maintain a controlled tension on the web 106 of fluted filter media as the web 106 is wound onto the mandrel 112. The invention provides the capability to specifically tailor the speed at which the winding apparatus 100 operates to match the abilities of a particular individual operating the apparatus 100, while still maintaining a desired tension in the web 106.

The linear speed at which the web 106 is fed to the mandrel 112, and the driving torque applied to the mandrel 112 can be continually controlled during the winding process, according to a predetermined program to precisely control tension applied to the web 106 at various points during winding of the filter pack 104. It may be desirable, for example, to have a pre-programmed acceleration and deceleration period at the beginning and end of the winding operation, where the linear speed at which the web 106 is fed to the mandrel 112 is respectively increased and decreased at predetermined rates. Either or both of the winding motor 118, or the controller 164 may include sensors or circuitry for sensing the driving torque of the winding motor 118.

In general, it is contemplated that the driving torque to the mandrel 112 will preferably be maintained at a substantially constant value during winding, regardless of the linear speed at which the web 106 is being fed to the mandrel 112. The driving torque will cause the rotational speed of the mandrel 112 to vary, and allow the mandrel 112 to accelerate and decelerate, as required, to maintain a constant tension in the web 106 as the feed speed varies, as will inherently occur, for example, when winding a media pack with a non-circular cross section.

In one embodiment, it is contemplated that the web 106 may simply be fed to the mandrel 112 at a substantially constant linear speed, during winding, and the winding motor 118 may be controlled to provide a substantially constant torque. The terms substantially constant linear speed and torque are intended to mean that, except for brief periods of acceleration and deceleration at the beginning and end the winding operation, the linear speed will be held at a constant value, and the driving torque will be held at a constant values. The value of substantially constant linear speed for feeding the web 106 can be selected, and adjusted, to allow individual operators the flexibility to match the winding speed to their respective skill in operating the winding apparatus 100. The value of substantially constant torque can be selected to provide a desired tension on the web 106 during winding, virtually independent of the skill of the operator, so that the coiled filter packs 104 will have a substantially uniform size and shape when completed, and to preclude crushing of the inner layers of the media 108 by excessive tension in the outer layers.

Figure 8:
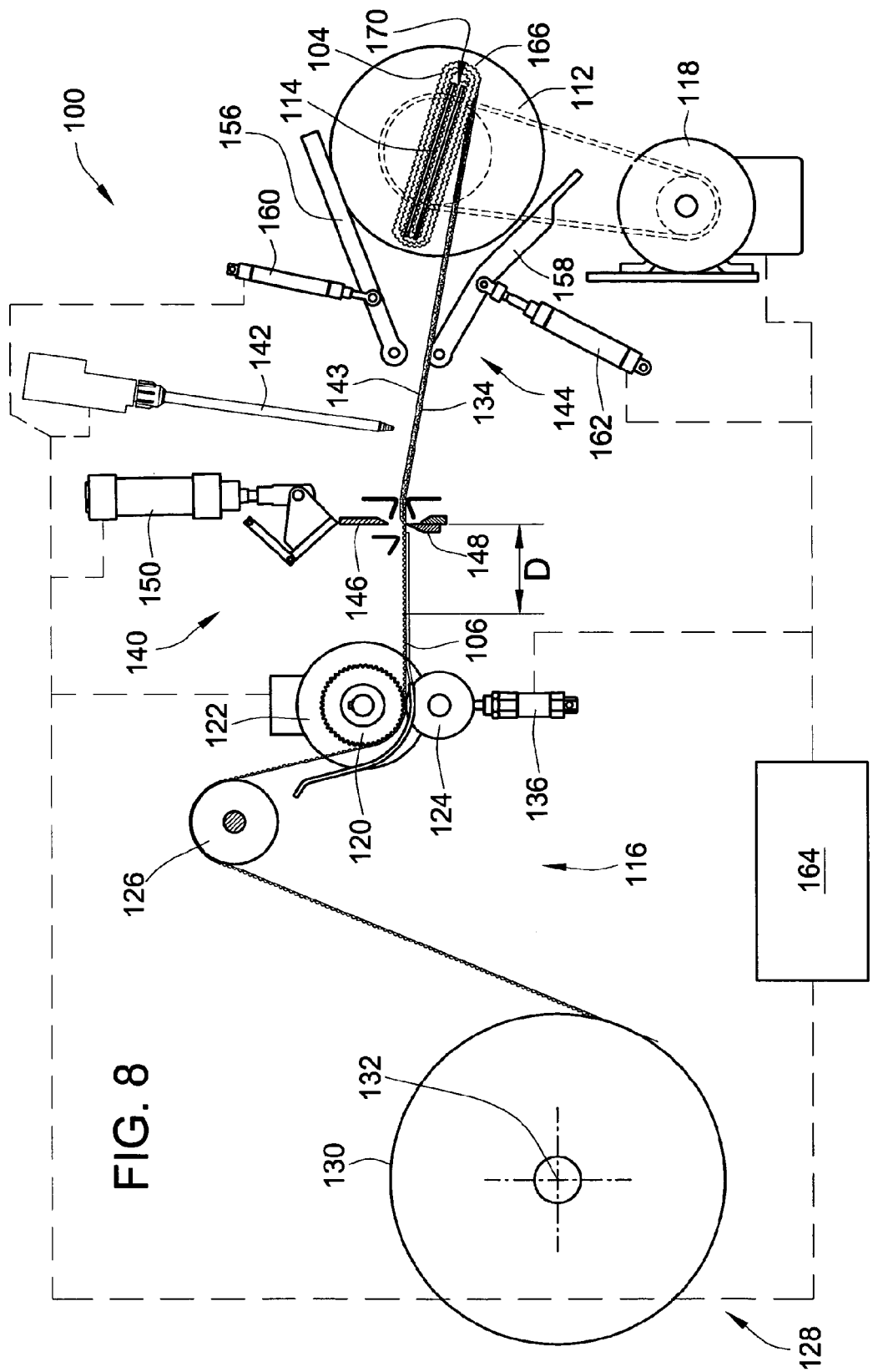
Figure 9:
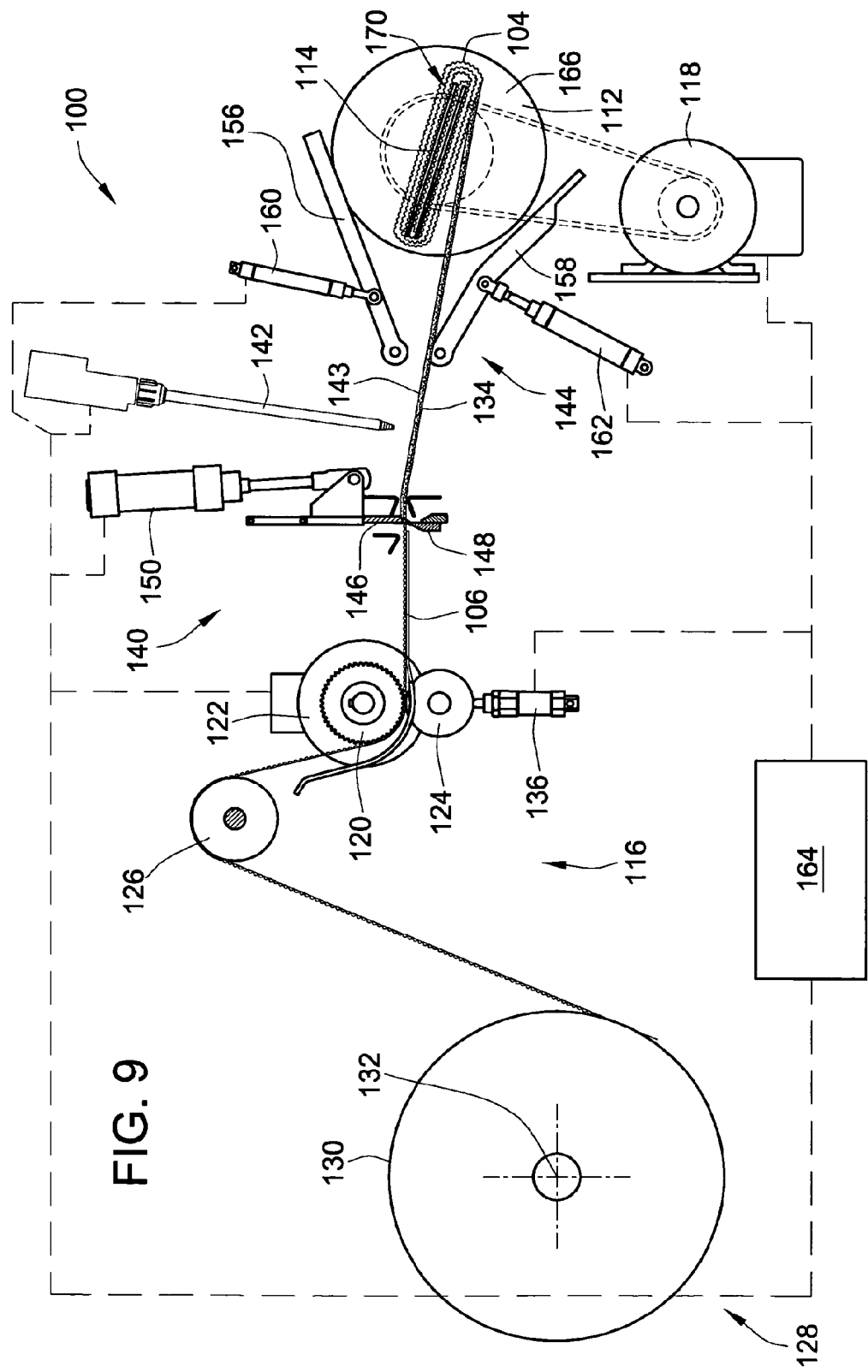
Figure 10:
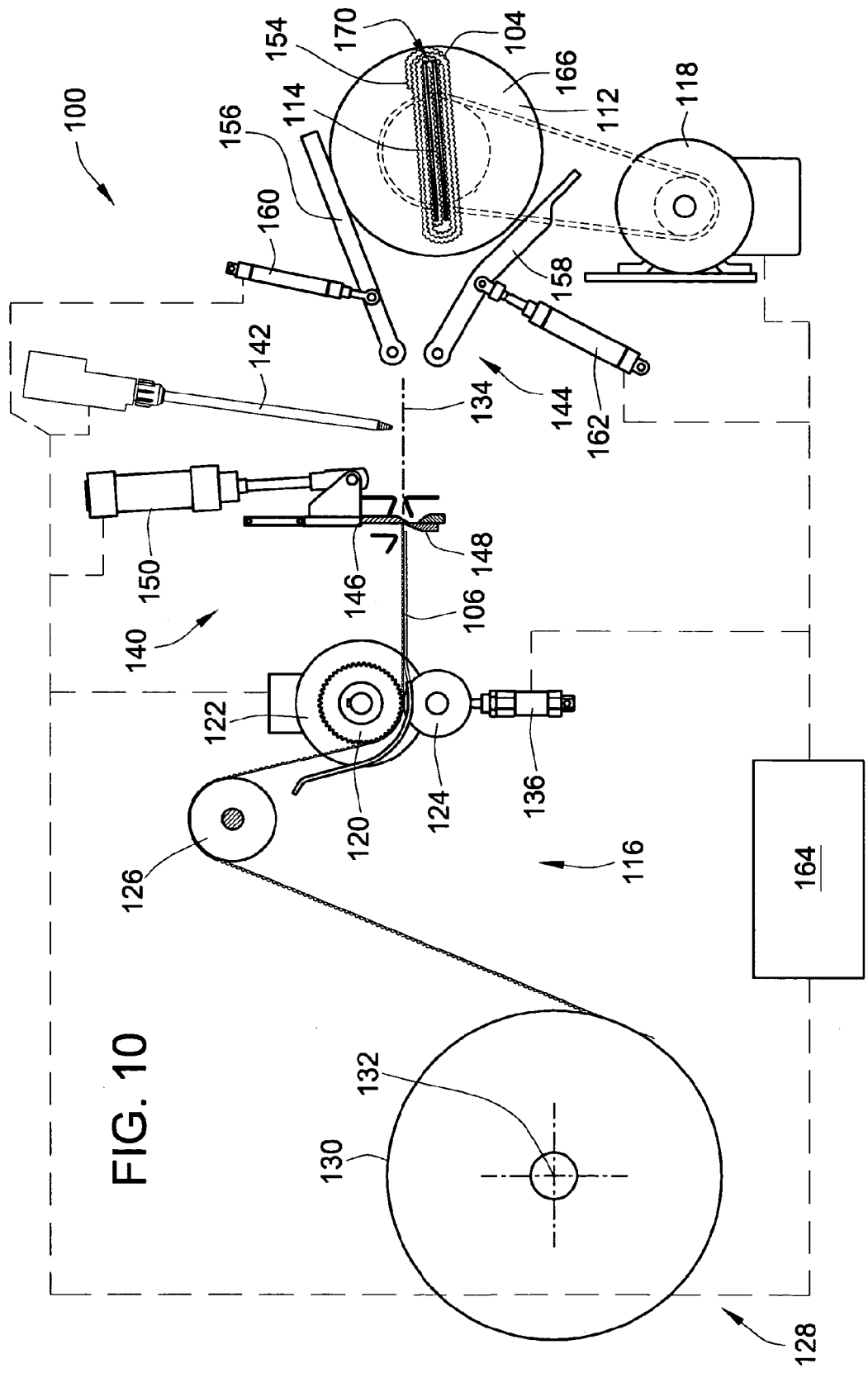

As shown in FIG. 8, the web drive motor 122 then reverses and draws the web back through the cutter 140 a distance equal to the over-travel distance D, and positions a second peak 105 of the web 106 directly under the cutter 140. As shown in FIG. 9, the cutter 140 is actuated to sever the web 106 and form the trailing edge 154, as shown by dashed lines in FIG. 8. As shown in FIG. 10, the operator then jogs the mandrel 112 to wrap the distal end of the web 106 onto the filter pack 104, fills the half-peak at the trailing edge 154 of the web 106 with an adhesive/sealant, and removes completed the filter pack 104 from the mandrel 112 by actuating a mechanism (not shown) that moves the plates 166-168 of the mandrel 112 apart from one another to release the filter pack 104 from the channels 170, 172 of the mandrel 112. The completed filter pack 104 is then set aside of the adhesive/sealant 143, 113 to cure, and/or is sent on to subsequent operations, such as attaching resilient seals 174, or other components, such as the seal support frame 176, that may be required to complete fabrication of the filter element 102 including the filter pack 104, as shown in FIG. 15.

The operations described above may then be repeated to form the next filter pack 104. It should be noted, however, that the operations described above in relation to FIG. 1 need not be performed for subsequent filter packs, because, once the winding apparatus 100 has been initialized to properly form the leading edge 152 of the first filter pack 104 to be formed from a given master roll 130 of media, the operations described in relation to FIG. 9 will simultaneously form the trailing edge 154 of one filter pack 104 and the leading edge 152 of the next filter pack 104, as shown in FIG. 11.

Those having skill in the art will also recognize that, although invention has been described herein with reference to several exemplary embodiments, many other embodiments of the invention are possible.

For example, although the exemplary embodiments of the apparatus and methods described herein have focused on a media pack 104 having a core-less construction, the invention can also be used to form media packs 180, as shown in FIG. 17, having the media 108 coiled around a central core 182. Where it is desired to form media packs having a core, the core may be attached to the mandrel 112, for rotation therewith, and the leading edge 152 of the web 106 is attached to the core, prior to beginning winding, through the use of a wide variety of means including, but not limited to, taping the leading edge to the core, sliding the leading edge into a slot in the core, bonding the leading edge to the core with an adhesive, or mechanically fastening the leading edge to the core with one or more fastening devices.

Figure 18:
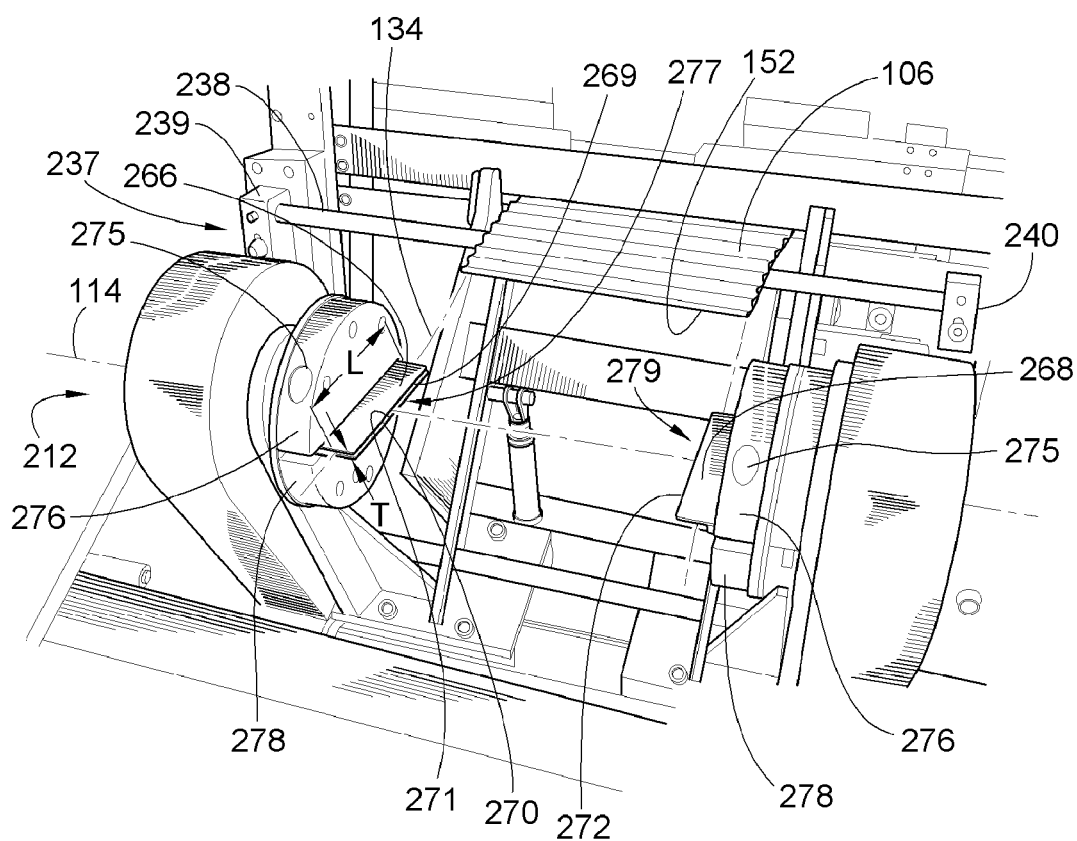
FIG. 18 is a perspective view of a mandrel, substantially similar to that of FIG. 14 for use with the winding apparatus of FIG. 1.

FIG. 18 illustrates a perspective view of an alternative mandrel 212 for use in practicing an embodiment of the present invention. The mandrel 212 is similar to mandrel 112 discussed previously. As discussed previously, mandrel 212 may be driven with constant torque or varying rotational speed to receive a web 106 that is fed at constant linear speed. As the mandrel 212 winds web 106 into a media pack 104 (See FIG. 16), it forms successive wound layers of media. Mandrel 212 includes a pair of tools 266, 268 for engaging first and second longitudinal sides of the web 106, respectively, during winding. The illustrated tools 266, 268 may be the same or substantially similar to the side plates 166, 168 discussed previously, which are forms of tools. The tools 266, 268 include slots or channels 270, 272 for receiving and engaging the longitudinal sides of the web 106 during winding. The channels or slots 270, 272 formed by the tools 266, 268 or bounded by surfaces 269, 271. 269, 271 may also be referred to as tool faces 269, 271.

The tools 266, 268 are preferably removably mounted to the mandrel 212 for rotation about axis of rotation 114. The tools 266, 268 are removable to permit switching between various tooling to alter the winding characteristics of the mandrel 212. By changing the tooling, the shape of a resulting media pack 104 and the engagement between the mandrel 212 and the web 106 may be selectively varied. Additionally different shapes of media can be wound by the same machine to include for example the winding of both circular and oblong shaped medias on the same machines. Other shapes can be wound as well.

On opposite sides, the mandrel 212 includes top clamping blocks 276 operatively positioned relative to bottom clamping blocks 278 to sandwich the tools 266, 268 therebetween. The top and bottom clamping blocks 276, 278 may be operatively secured to one another or otherwise to the mandrel 212 to maintain their relative positions to mount the tools 266, 268. In one method, bolts (not shown) may pass through apertures 275 in the top clamping block 276 and through apertures in the tools 266, 268 (not shown) and into the bottom clamping block 278 to securely affix the tools 266, 268 to the clamping blocks 276, 278.

It is preferable to have the clamping blocks 276, 278 and tools 266, 268 weighted and shaped to promote balancing about the axis of rotation 114 to prevent unnecessary vibrations during winding.

The tools 266, 268 define channels 270, 272, respectively, for receiving the longitudinal edges of a leading portion of the web 106 proximate the leading edge 152 to engage the web 106. The rest of the web 106 that forms a media pack 104 will be wound around the tools 266, 268 and, consequently, the leading portion of the web 106. Preferably, the longitudinal length of the leading portion of the web 106 includes five or more peaks 105 of the web 106 and more preferably eight or more peaks 105. In terms of actual length, it will typically be at least about ½ foot, and more usually about 1 foot or more for most engine air filtrations applications although other sizes are possible depending upon filtration capacity needs.

The web 106 is fed to the channels 270, 272 from a feeder (see for example feeder 116 of FIG. 2) along feed path 134. The web 106 may be manually aligned with the channels 270, 272 by an operator or automatically using mechanical guides, as discussed previously.

The leading portion of the web 106 may be received through end openings of the channels 270, 272. The channels 270, 272 of tools 266, 268 have end openings at both ends. The end openings open in a direction that is generally perpendicular to the axis of rotation 114 such that the web 106 may be fed into the channels 270, 272 from the end of the tools 266, 268. It could potentially also be feed in sideways with or without moving the tools toward and away from each other.

With the leading portion of the web 106 received in the channels 270, 272, the leading portion of the web is received on or proximate the tool faces 269, 271 of the tools 266, 268. When the web is initially inserted into the channels 270, 272, the face sheet of the web 106, i.e. the non-fluted sheet or bottom sheet (see FIG. 11), is received on and rests on tool face 271 of the tools. Preferably, the leading portion of the web is about the same length as the longitudinal length of the tooling, however an exact match is not necessary to accomplish this embodiment. The initial leading web length portion trapped in the channels 270, 272 may also be shorter or slightly longer than the overall length of the channels.

The channels 270, 272 also define side openings 277, 279 that open toward each other and generally parallel to the axis of rotation 114. The side openings 277, 279 allow the web 106 to extend out of the channels 270, 272 along the axis of rotation 114 and between the pair of tools 266, 268 as illustrated in FIG. 19.

Figure 19:
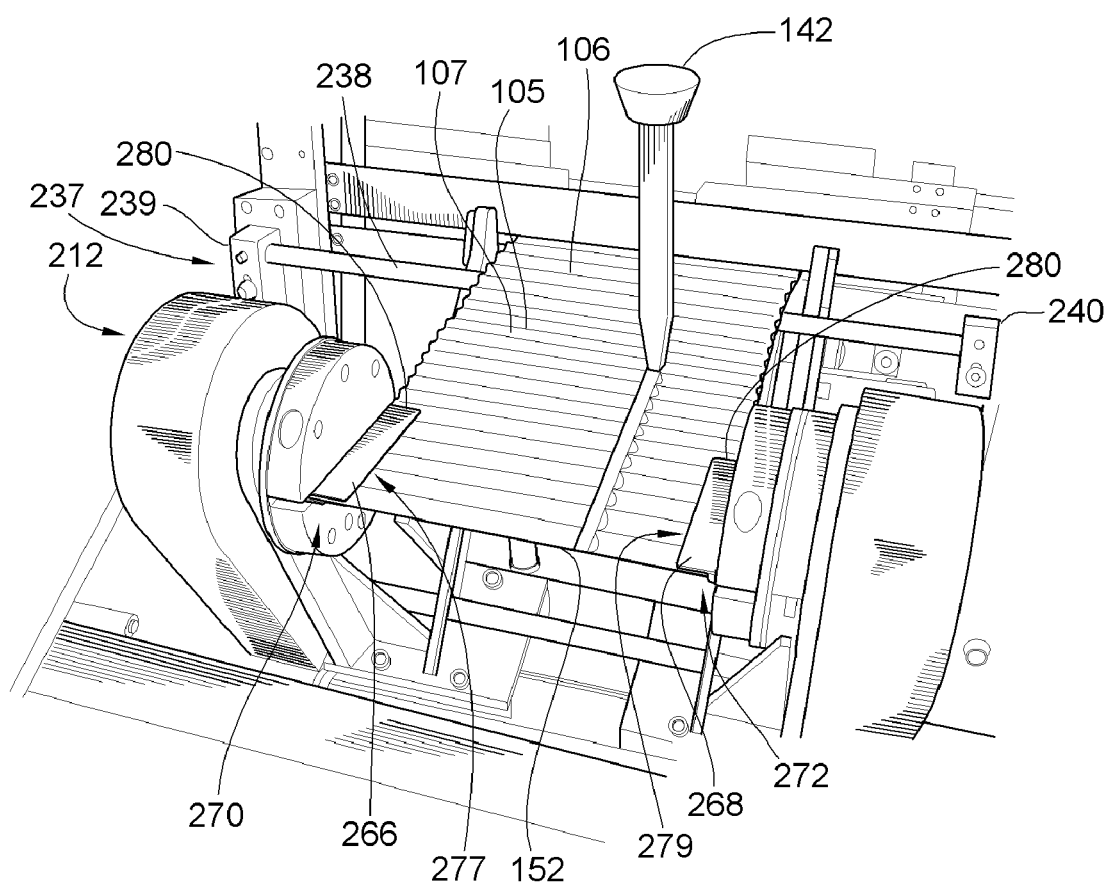
FIG. 19 is a perspective view of the mandrel of FIG. 18 having a leading section of a web of fluted filter material engaged by the tools of the mandrel.
Figure 20:
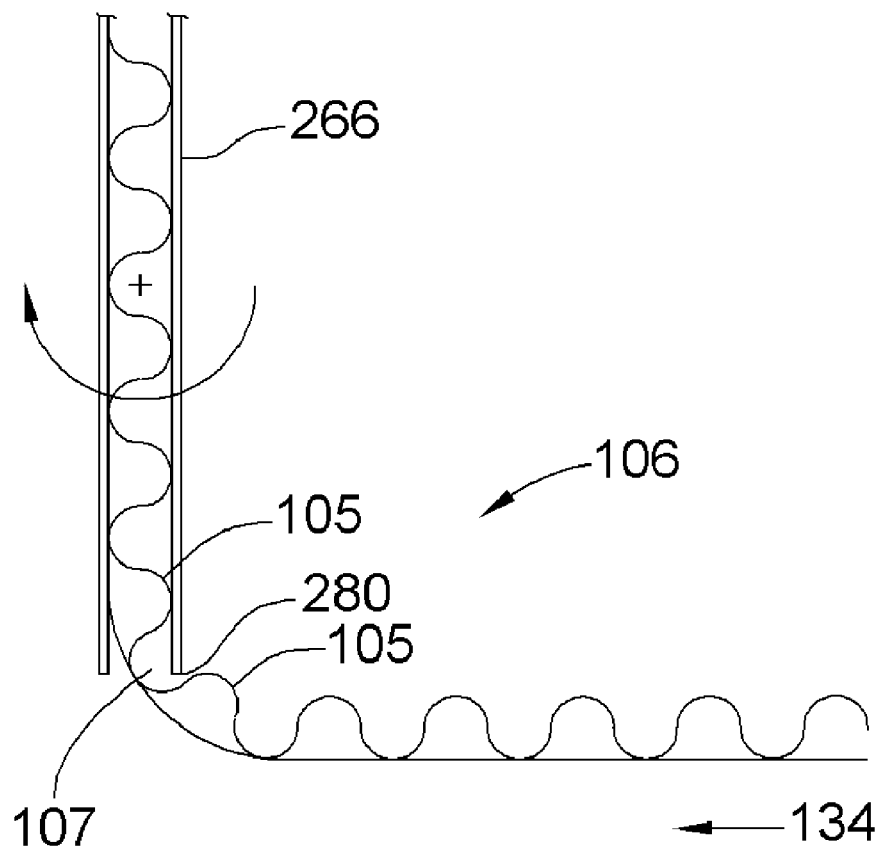
FIG. 20 is a simplified partial cross-sectional view of a section of webbing engaged by the tooling of FIG. 18 after the tools have rotated 90 degrees to illustrate the beginning of the winding process as the web of filter media is being wound around the tools of the mandrel and the leading portion of the web.

In a preferred operation and as illustrated in FIGS. 19 and 20, the trailing edges 280 of the tools 266, 268 extend transverse to the longitudinal sides of web 106 and align with a valley 107 of the web 106. This alignment allows the trailing edges 280 of the tools 266, 268 to more securely engage the peaks 105 of the web 106 by penetrating an adjacent valley 107 as the mandrel 212 winds the web 106, around the tools 266, 268. This alignment facilitates increased engagement between the tools 266, 268 and the longitudinal sides of the web 106 reducing the potential for slippage of the web 106 relative to the tools 266, 268 during winding of the web 106. However, in some embodiments, the web 106 is initially permitted to slip a distance relative to the tool faces 269, 271 until the trailing edge 280 of the tools engage a peak 105 by penetrating a valley 107 of the web 106. While the trailing edge 280 is discussed as "engaging a peak 105", this does not require engaging web 106 exactly at a peak but explicitly includes engaging the sidewalls of a flute that extends between the peaks 105 and valleys 107.

Figure 35:
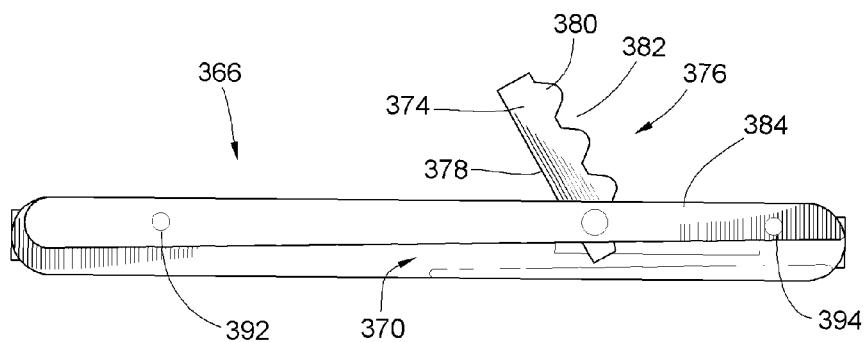
FIGS. 35 and 36 illustrate an alternative embodiment of a tool for use with the mandrel of FIGS. 14 and 18.
Figure 38:
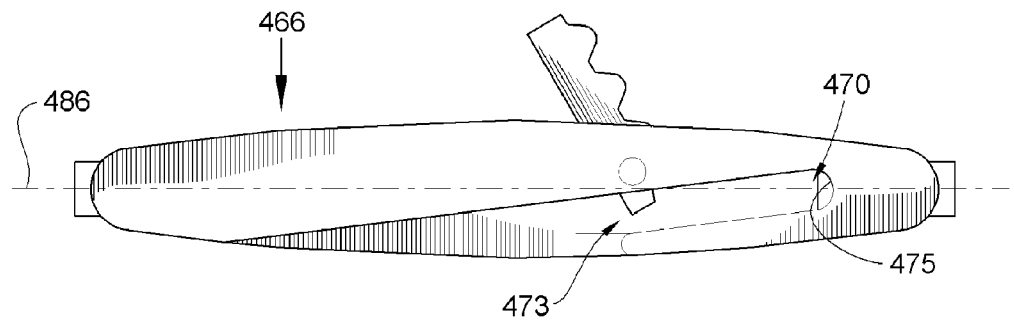
FIGS. 38 and 39 illustrate a further alternative embodiment of a tool for use with the mandrel of FIGS. 14 and 18.
Figure 40:
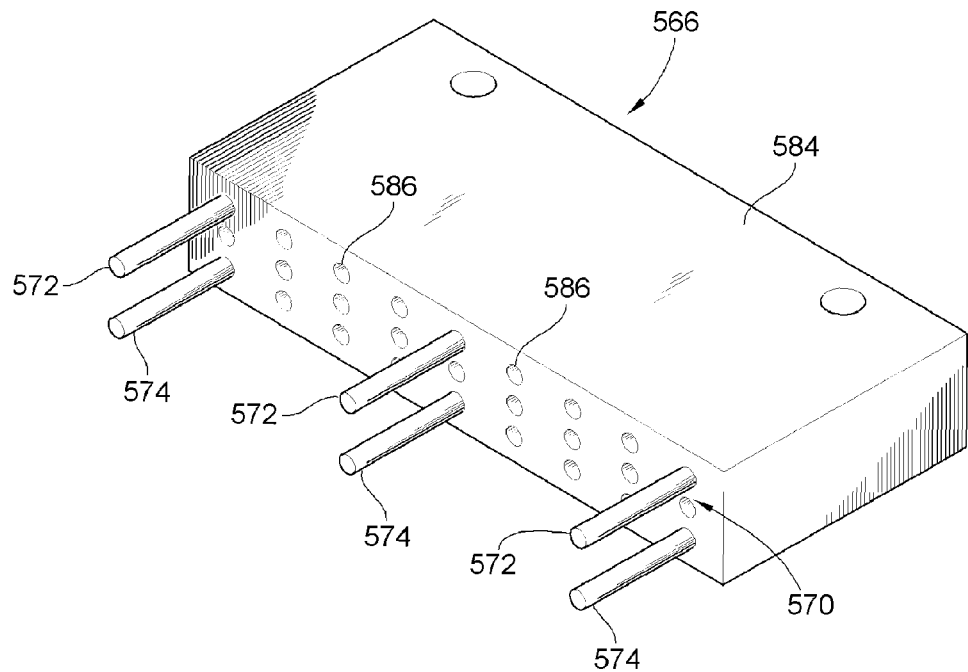
FIGS. 40-42 are illustrations of an alternative tool for use with the mandrel of FIG. 18.

The shape and size defined by the outer periphery of the tools 266, 268 are two factors that establish the relative shape of a media pack 104 formed by winding the web 106 using the mandrel 212. Tools 266, 268 are elongated thus forming elongated media packs. As identified previously, the tools 266, 268 can be switched with other tooling such as illustrated in FIGS. 35, 38, 40 to alter the configuration of the tools around which the web 106 is wound to alter the shape of the media pack 104 formed using the mandrel 212.

The tools 266, 268, at least partially, define the internal major axis and internal minor axis of the elongated media pack 104 which correlate to or otherwise define the ultimate elongated shape of the media pack 104. The longer a major axis of the tools 266, 268 such as length L relative to the minor axis of the tools 266, 268 such as thickness T, the more elongated the ultimate media pack will be. In one embodiment, the length L is greater than the width of five consecutive flutes and the thickness T is greater than the width of two consecutive flutes of the web 106.

As discussed previously, it can be important to form the media pack 104 with the web 106 at a constant tension. One benefit of winding the web 106 at a constant predetermined tension is that shear forces between adjacent layers of media remain substantially constant. If shear forces between adjacent layers become too large, adjacent layers may slip relative to one another causing the seal bead 143 positioned between two adjacent layers to be displaced or otherwise deformed, which may reduce the filtering integrity of the resulting media pack 104.

Because the tools 266, 268 are elongated in shape and the ultimate media pack 104 resulting from winding around these tools 266, 268 is elongated, also referred to as and meaning the same thing as oblong (in the illustrated instance more specifically race track shaped), one method of maintaining constant tension includes driving the tools 266, 268 at varying speed to receive the web 106 when it is fed to the mandrel 212 at a constant speed. More particularly, the drive motor of the mandrel 212 rotates the tools 266, 268 more quickly when the major axis 286 of the media pack is transverse to the feed path 134 as opposed to when the minor axis 284 of the media pack is transverse to the feed path 134. For example, the tools 266, 268 may be rotated at a relatively slow speed when oriented as illustrated in FIG. 18 but will be rotated at a relatively high speed when oriented as illustrated in FIG. 20. The rotational speed of winding is ramped up as the leading section of the web 106 or the major axis 286 approaches being transverse to the feed path 134 and is ramped down as the leading section and major axis 286 approach being generally parallel to the feed path 134. The ramping up and down of the rotational speed of winding may occur continuously such that the rotational speed of the mandrel 212 is substantially continuously varied, and may approach a sinusoidal profile. In contrast for other shapes such as winding circular media with the machine, the rotational speed may not need to vary or could be constant.

Figure 21:
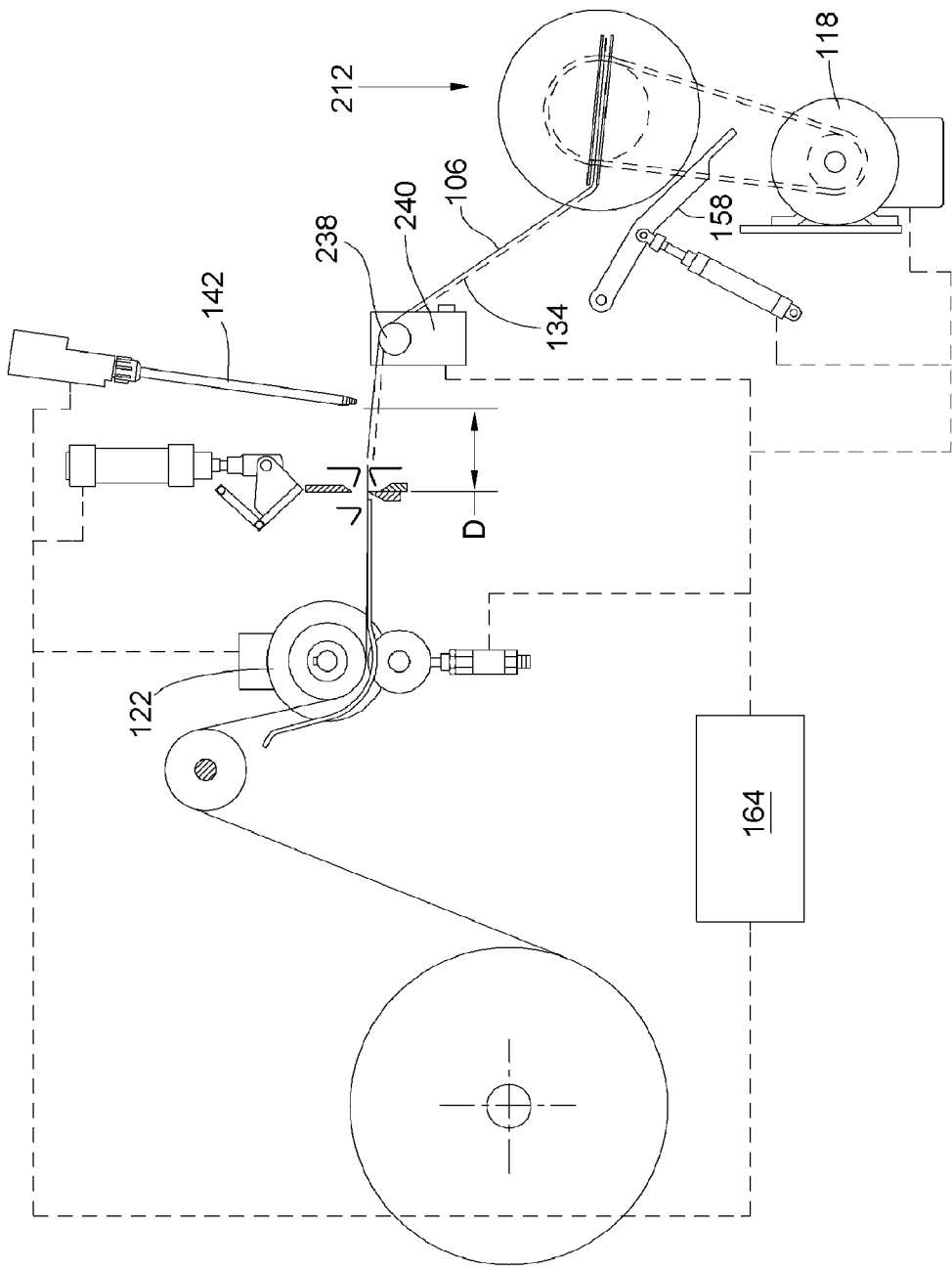
FIG. 21 is a schematic partial view of a winding apparatus according to the present invention including a tension feedback apparatus for sensing the tension of the web as it is wound.

The tension of the web 106 may be sensed and then used to control the drive motor of the mandrel 212. This information may be gathered by the drive motor itself or external sensors. FIGS. 18, 19 and 21 illustrate one arrangement for sensing the tension of the web 106. This embodiment utilizes a tension feed back device 237 positioned adjacent the web feed path. The tension feed back device 237 includes a bar 238 supported by a pair of load cells 239, 240 across which the web 106 rides as it is wound using the mandrel 212. As the tension in the web 106 varies, the loading of the web 106 on bar 238 varies indicating a change in tension of the web 106. This change in tension can be used to control the drive motor 118 to driving of the mandrel 212. In one method, the controller 164 is operatively connected to the load cells 239, 240 and operatively controls the drive motor 118 according to the information sensed by the load cells 239, 240. For example, if the tension information sensed by the load cells 239, 240 exceeds a maximum value the controller 164 reduces the rate of rotation of the mandrel 212. Conversely, if the sensed tensions information is below a minimum, the controller 164 increases the rate of rotation of the mandrel 212. The bar 238 may be replaced with a roller to reduce drag on the web 106. This can control the tightness of the wound media. The load cells 239, 240 (and other load cells for other embodiments) may be a variety of force measurement devices or force transducers that include, but are not limited to, strain gauges, wheatstone bridges, etc. The term load cell will be understood to be broad enough to incorporate other types of force sensors.

Figure 22:
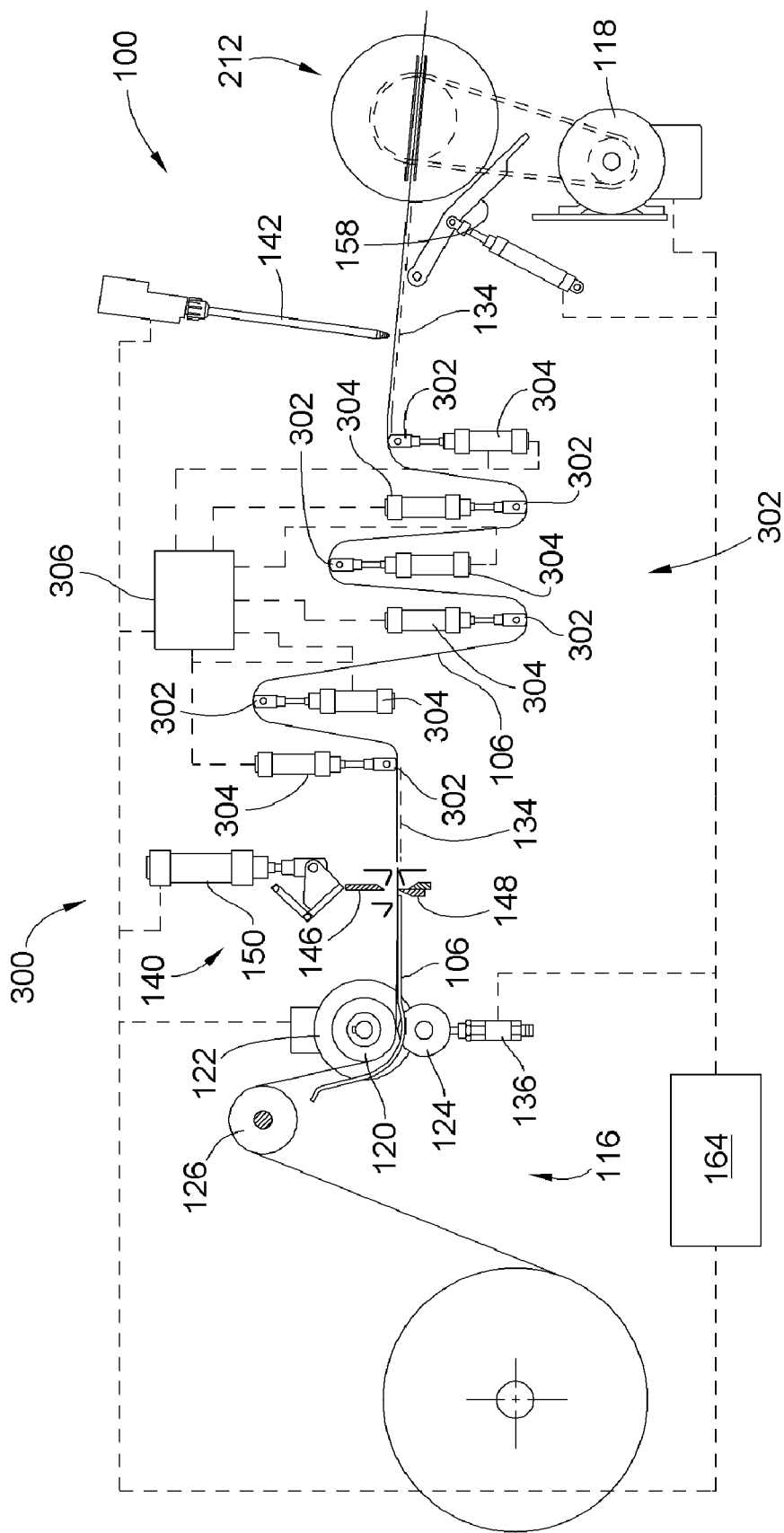
FIG. 22 is a schematic partial view of a winding apparatus according to the present invention including a web tension adjusting apparatus in the form of a plurality of dancing rollers positioned between the web feeder and the mandrel for adjusting the tension of the web as it is wound.

FIG. 22 illustrates an alternative embodiment of a winding apparatus 300 that incorporates a plurality of dancing rollers 302 for controlling the tension of the web 106 as it is being wound by the mandrel 212. The web 106 is interwoven between adjacent rollers 302. The rollers 302 are mounted for movement relative to one another such that the rollers 302 may move up and down depending on the tension of the web 106 and the orientation of the media pack 104 and tools during winding. The rollers 302 can actuate up or down to increase or ease the tension in the web 106 by adjusting the feed path 134 of the web 106 as it approaches the mandrel 212.

More particularly, the rollers 302 are adjusted to lengthen the feed path to increase tension and adjusted to shorten the feed path to reduce tension.

As illustrated, the rollers 302 are mounted to linear actuators 304 to permit movement of the rollers 302. In a preferred embodiment, the linear actuators 304 are pneumatic or hydraulic and are operably coupled to a common accumulator 306. The common accumulator 306 may provide feed back between the individual linear actuators. However, alternatively, other configurations of mounting and controlling the positions of the rollers 302 can be used, for example, the rollers 302 could be mounted to spring members to permit movement of the rollers 302. Other devices that could be used to control the configuration of the feed path 134, and as illustrated, rollers proximate the feed path, include adjustable springs having adjustable tension/compression; pneumatic or hydraulic actuators or air shocks; or electrical load devices.

To increase uniformity of the tightness of the layers of a formed media pack 104, it can be beneficial to generally maintain the web 106 in a state of wrapping as the mandrel 212 rotates. When the major axis 286 of the media pack 104 is perpendicular to the feed path 134, the web 106 is wound around the end of the media pack 104 and is wound relatively tightly in comparison to when the major axis of the media pack 104 is parallel to the feed path 134 as the web 106 is wound on to the sections of the media pack 104 extending between the ends.

Figure 23:
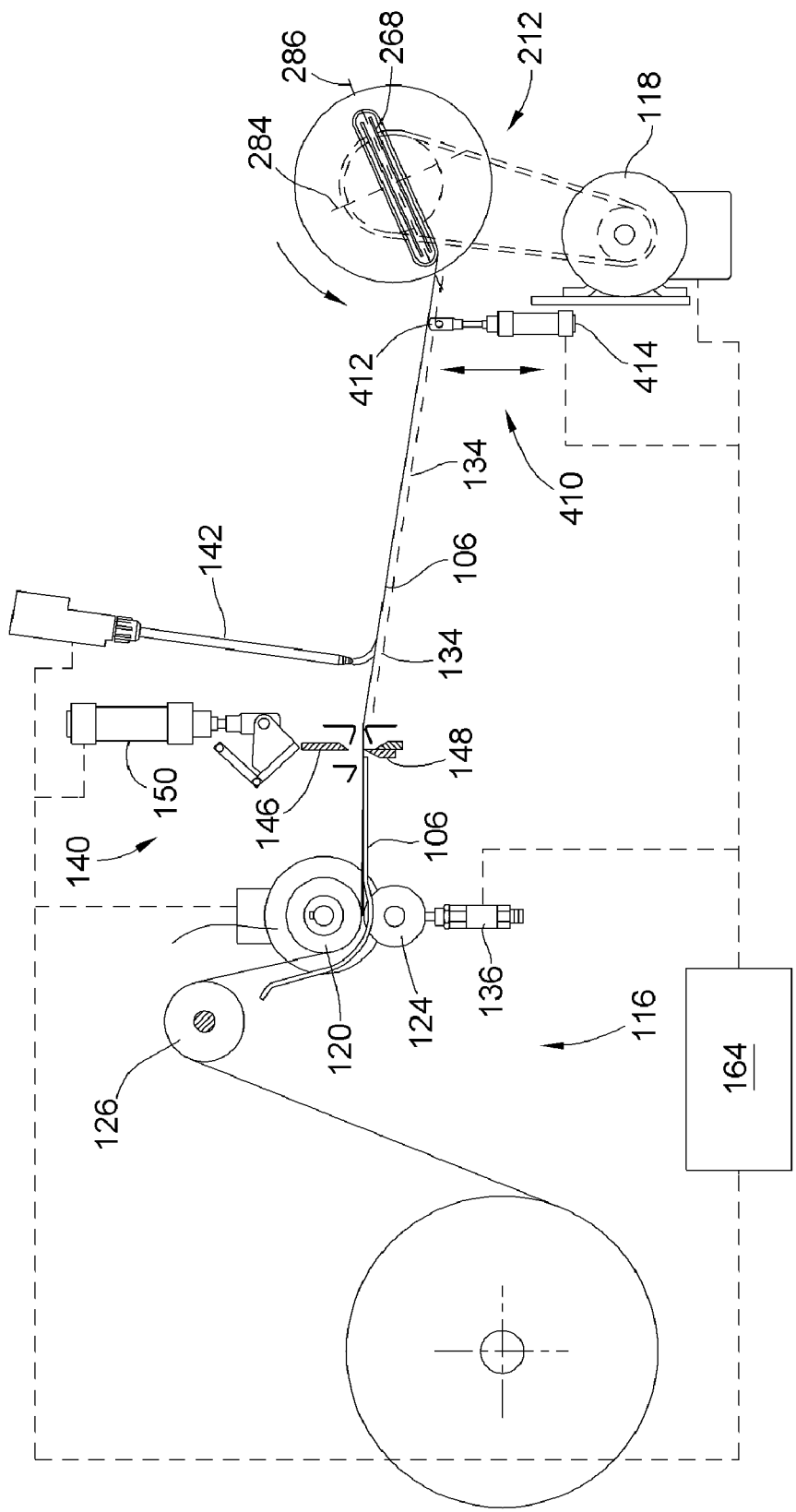
FIGS. 23 and 24 are schematic partial views of a winding apparatus that includes a feed path adjuster.
Figure 24:
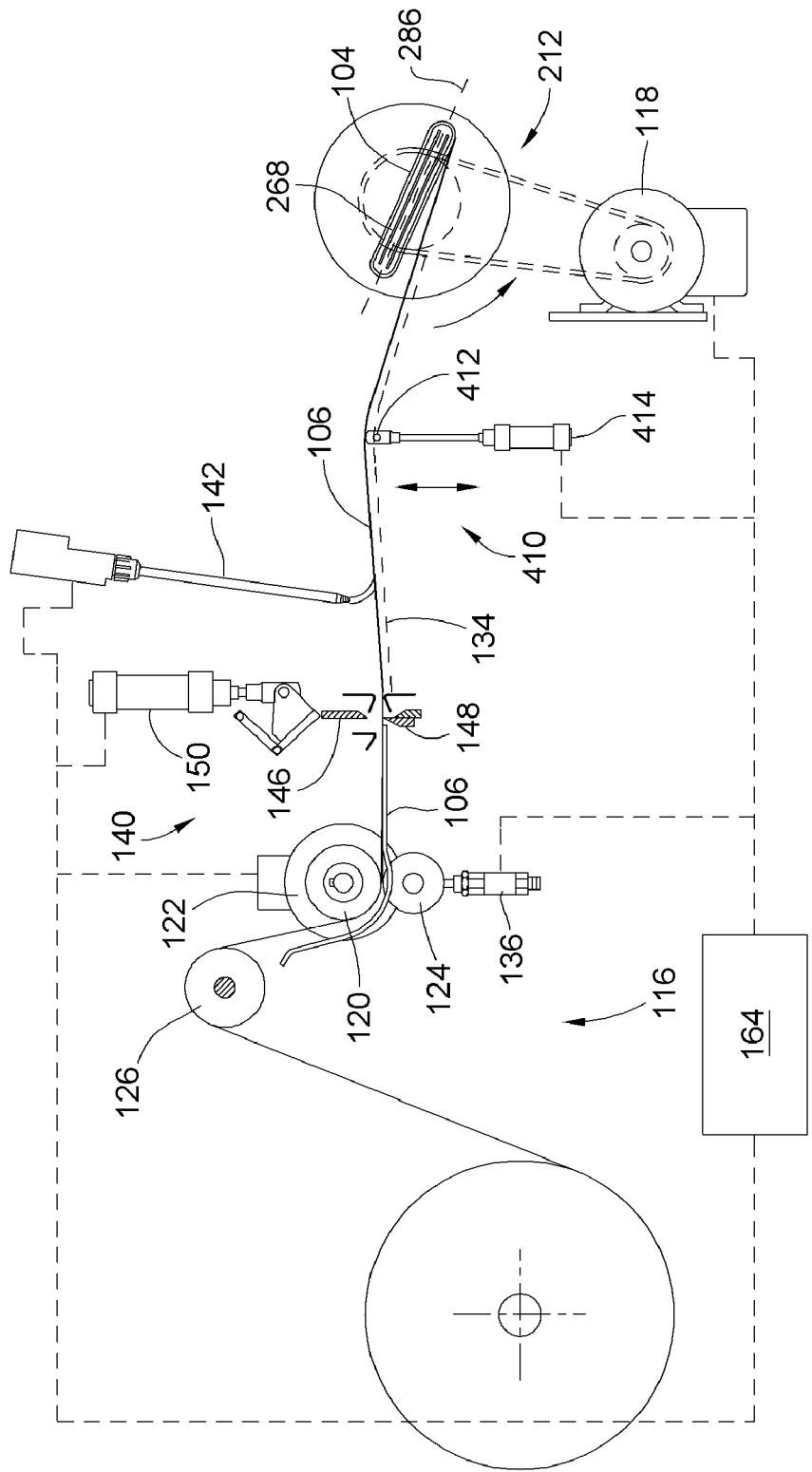

To compensate for the varying tightness of the wrap, the illustrated winding apparatus of FIGS. 23 and 24 includes a feed path adjuster 410 positioned proximate the feed path 134 that varies the feed path 134 depending on the angular orientation of the media pack 104. The feed path adjuster 410 includes a roller 412 over which the web 106 rides. The roller 412 is driven in a direction generally transverse to the feed path 134 by actuator 414 to adjust an angle the feed path 134 between the feeder and the mandrel 212 approaches the mandrel 212. As illustrated in FIG. 24, the major axis 286 is approaching an orientation close to parallel with the feed path 134. In this arrangement, the feed path adjuster 410 is extending to alter the angle at which the feed path is oriented relative to the major axis 286. As illustrated in FIG. 23, the feed path 134 is approaching being perpendicular to the major axis 286 and the web 106 is being wound proximate an end of the media pack 104. In this state, the feed path adjuster 410 is contracted to prevent over tightening the wrap of the web 106 as it is wound to the ends of the media pack 104.

Figure 25:
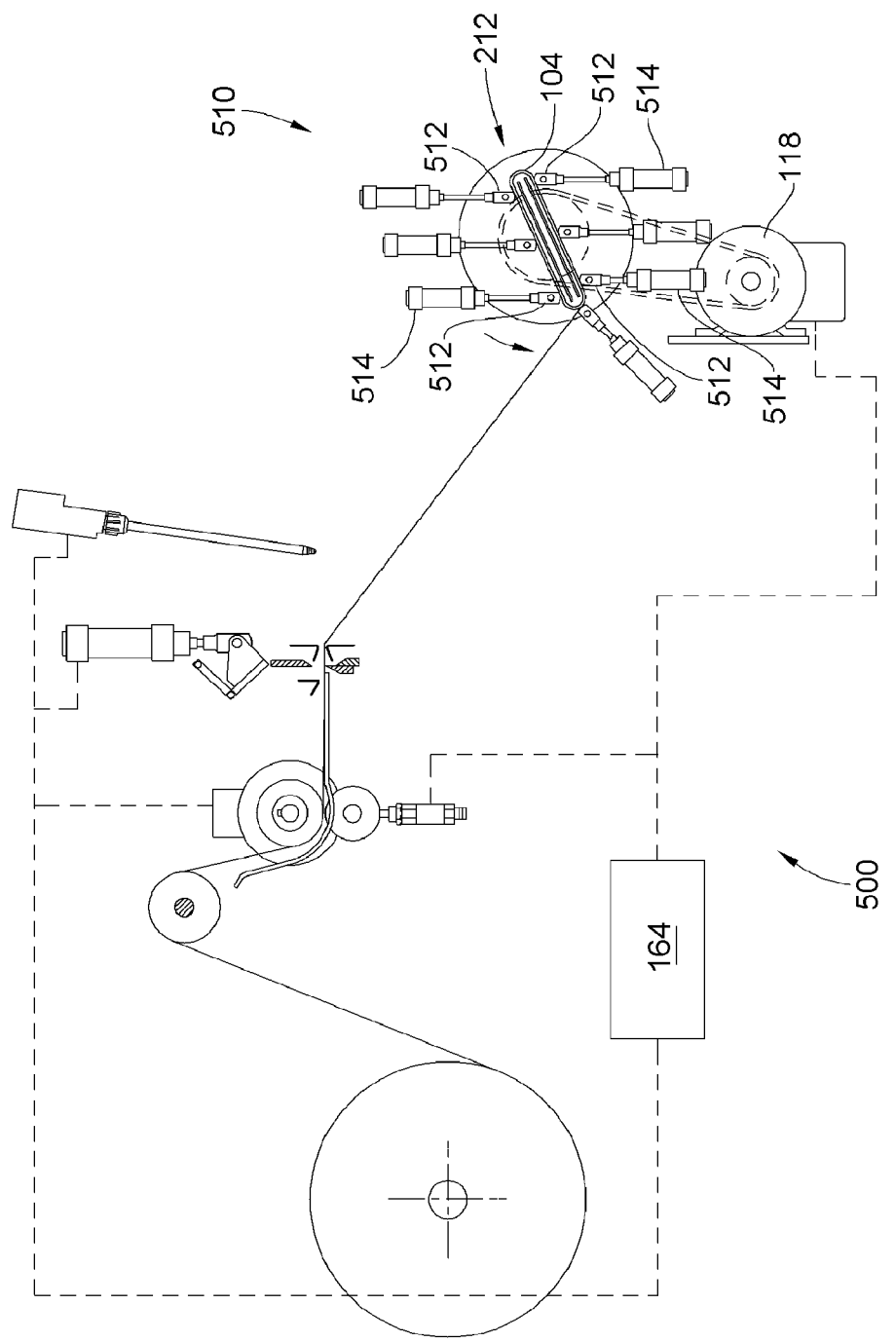
FIGS. 25 and 26 are schematic partial views of a winding apparatus according to the present invention that includes a web wrapping apparatus for assisting wrapping of the web in forming a media pack.
Figure 26:
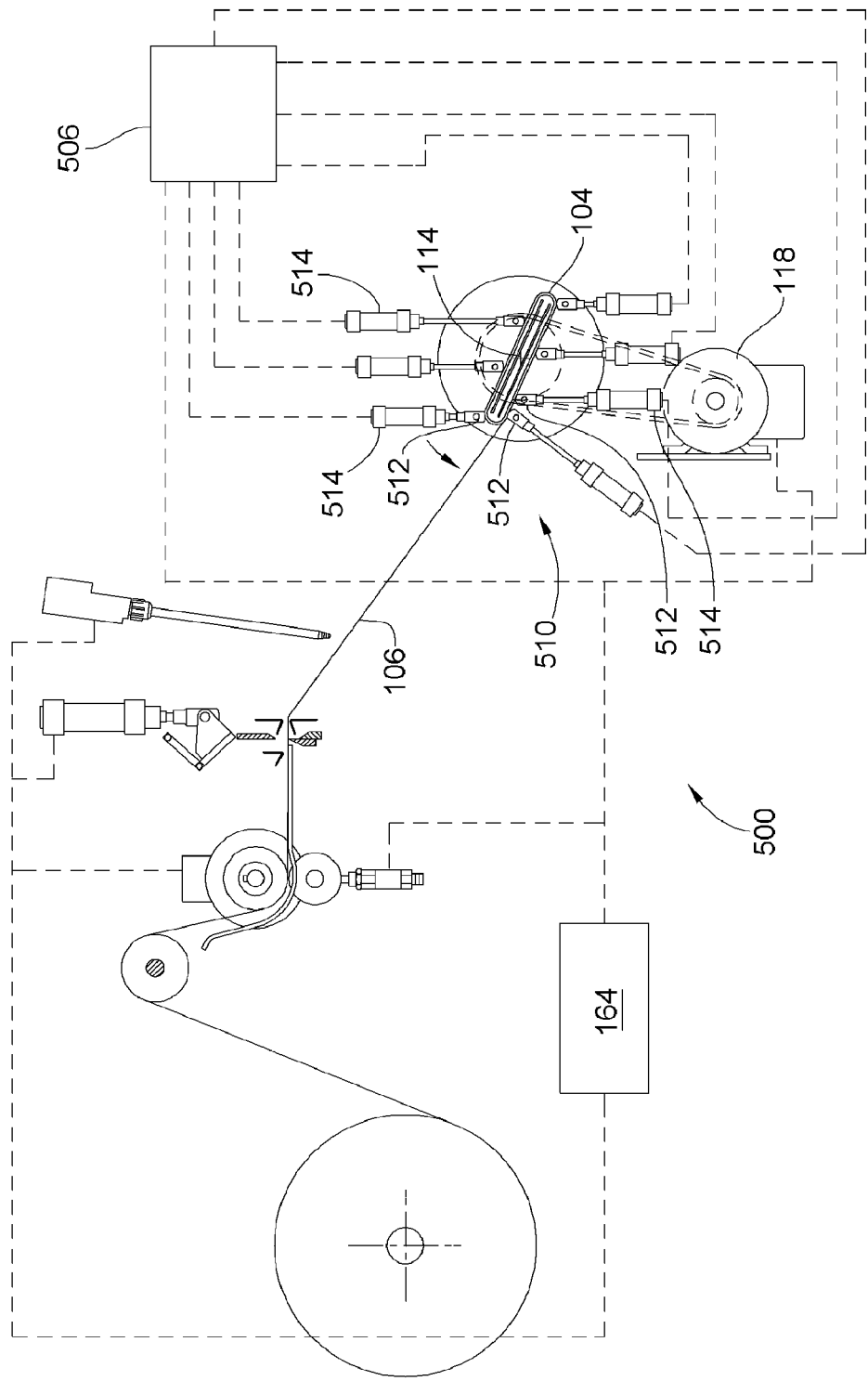

A further embodiment of a winding apparatus 500 is illustrated in FIGS. 25 and 26. The winding apparatus 500 includes a web wrapping apparatus 510 for facilitating maintaining a constant wrap tightness of the wound layers of the media pack 104, as the web 106 is wound. The web wrapping apparatus 510 presses the layers of web inward toward the tooling by pressing against the outermost layer of web. As illustrated, the web guide system 510 includes a plurality of rollers 512 mounted to linear actuators 514 for movement relative to the axis of rotation 114 of the media pack 104 as the media pack 104 is wound. Preferably, the linear actuators 514 are substantially angularly spaced about the axis of rotation and the action of the actuators 514 surrounds the media pack 104 with a constant pressure as the media pack 104 rotates about axis 114.

Because the media pack is elongated, the rollers 512 are driven inward and outward relative to the tooling and axis of rotation as the orientation of the media pack 104 changes during winding. The actuators 514 may be pneumatic, hydraulic and the like and may be operatively connected to a common accumulator to provide feedback between the actuators such that retraction of one actuator assists extension of another actuator. Alternatively, the actuators 514 could be a plurality of spring members that bias the rollers 512 towards the tooling to maintain pressure against the outermost layer of the media pack 104. The web guide system 510 may beneficially prevent relaxation along the minor axis of the intermediate segments of the media pack 104 that extend between the ends of the media pack 104. This assists maintaining the elongated shape of the media pack 104 during winding and maintaining the intermediate segments against one another and the tooling.

Figure 27:
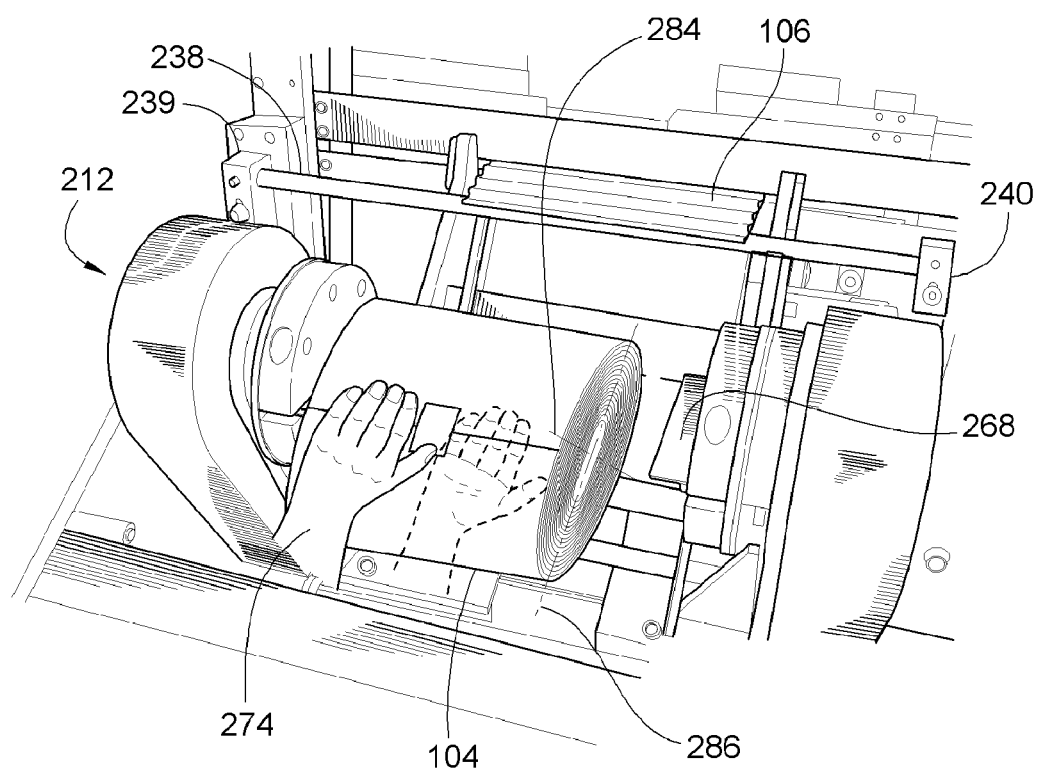
FIG. 27 is a perspective view of the mandrel of FIG. 18 illustrating an operator removing a wound media pack from the mandrel.

FIG. 27 illustrates a wound media pack 104 being removed from the mandrel 212. As shown therein, the media generally takes the desired elongated shape of the finished media pack. Preferably tape is applied shortly after winding is completed and the trailing edge of the media is cut. The tape is applied to prevent as much unraveling or loosening of the wound media pack as possible. The operator 274 grasps the wound media pack 104 proximate the minor axis 284 of the media pack 104 to remove the media pack 104 from the mandrel 212. With the operator 274 grasping the media pack 104, the tools 266, 268 may be transitioned axially away from each other thereby disengaging the tools 266, 268 from the web 106 and more particularly from the longitudinal sides of the leading portion of the web 106 proximate the leading edge 152. Prior to winding another media pack 104, the tools 266, 268 are axially transitioned toward one another to engage a new section of web 106.

Figure 28:
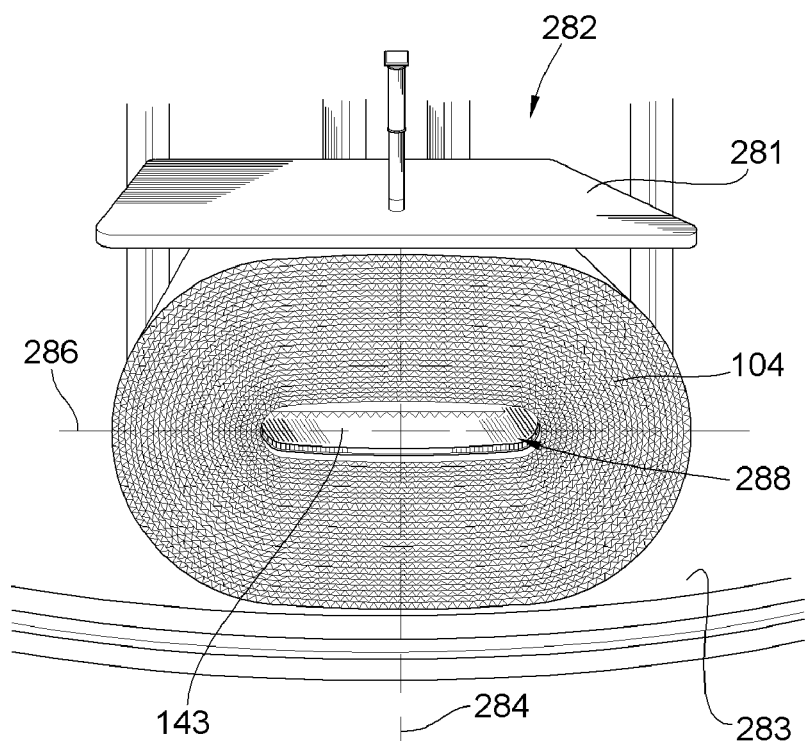
FIGS. 28 and 29 are illustrations of a fixturing device for securing a media pack after it has been removed from a winding apparatus, according to the teachings of the present invention.

Because the media pack 104 is wound directly to an elongated or oblong shape (i.e. non-circular), the operator 274 preferably grasps the media pack 104 along the minor axis 284 to prevent relaxation of the media pack 104 and to maintain the elongated shape as the media pack 104 is transferred to a fixturing apparatus 282 (See FIG. 28).

While the media pack 104 was depicted as being manually removed from the mandrel 212, removal of the media pack from mandrel 212 and transferring it to the fixturing apparatus 282 could be automated.

Figure 29:
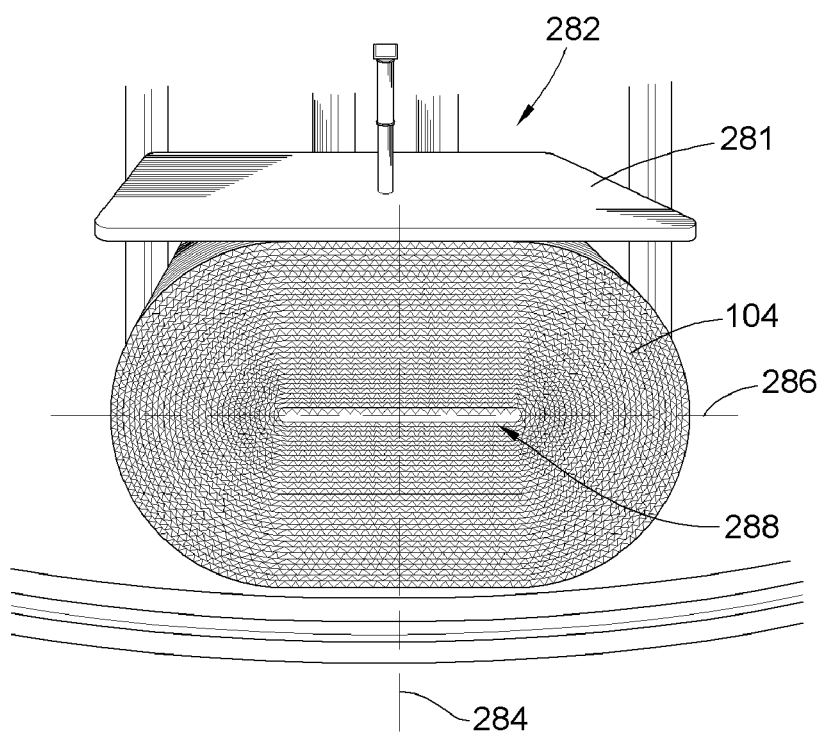

The media pack 104 is fixtured to maintain and support the media pack 104 in the elongated shape while curing or setting of the seal bead 143, or any other seal bead, that is applied during winding. Additionally and optionally, the media pack 104 may also be compressed to tighten the innermost central leading portion of media that was initially engaged by the tooling, which has been removed. Boards and other types of core inserts may be utilized to fill the void (if any) left by tool removal. Also the center area can also be filled with additional sealing material after winding. The fixturing may also be used to correct any inadvertent relaxation that has occurred. FIGS. 28, 29 illustrate fixturing or otherwise securing a media pack 104 in the race track or elongated shape with a fixturing apparatus 282 while the seal bead 143 cures. The illustrated fixturing apparatus 282 secures the media pack 104 along the minor axis 284 to maintain the shape formed during winding and to prevent relaxation of the media pack 104. After being removed from mandrel 212, the media pack 104 is placed between a top plate 281 and a table 283 of the fixturing apparatus 282. With the media pack 104 positioned between the top plate 281 and the table 283, the top plate 281 is actuated (e.g with an actuator, spring or weight/or being weighted) to press against the intermediate segment of media pack 104 along the minor axis 284 to maintain the media pack's shape. The top plate 281 may be operatively positioned such as by being manually positioned by an operator manipulating a lever or by being automatically positioned by an automated actuator. Preferably, the fixturing device 282 maintains the media pack 104 such that there is only a limited gap at the center 288 of the media pack 104, such as illustrated in FIG. 29. This limits the amount of area of the media pack 104 that is not used for fluid filtration. The center 288 of the media pack 104 is typically sealed by the seal bead 143 that is applied during winding.

Figure 30:
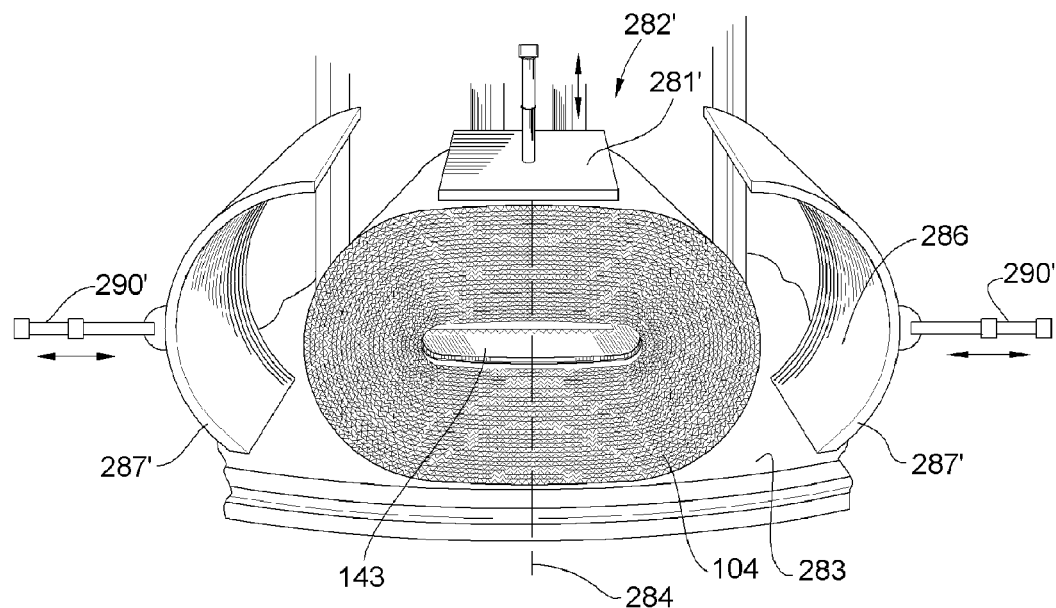
FIGS. 30 and 31 are illustrations of an alternative fixturing device for securing a media pack after it has been removed from a winding apparatus.
Figure 31:
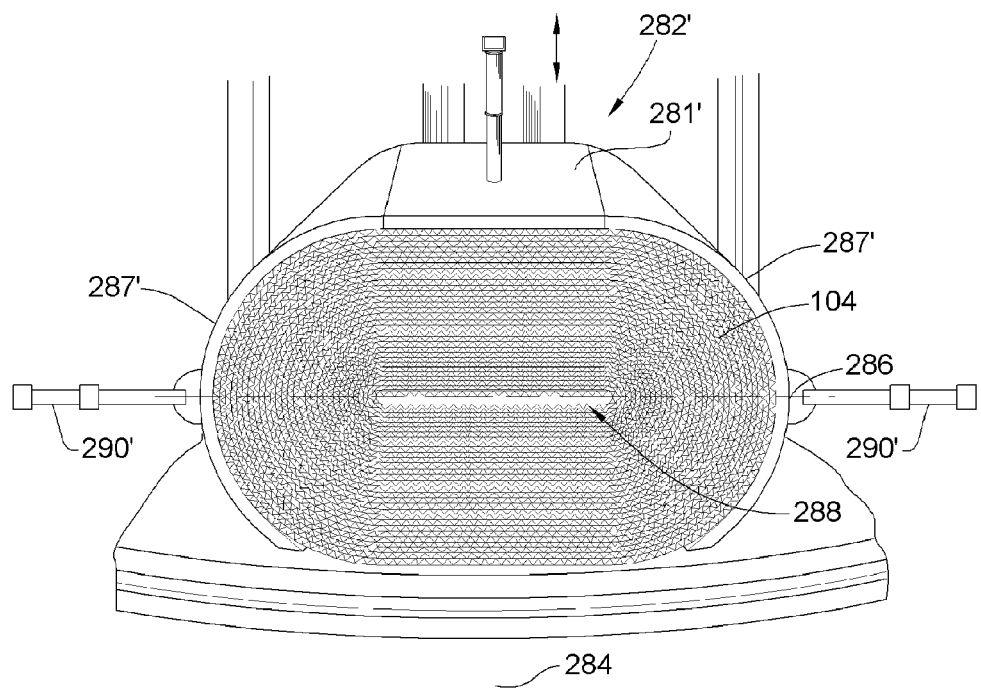

FIGS. 30 and 31 illustrate an alternative fixturing apparatus 282' that includes a top plate 281' that functions much like the top plate 281 of the previous fixturing apparatus 282. This fixturing apparatus 282' includes a pair of end plates 287' that generally align with the major axis 286 of the media pack 104 and apply pressure to the ends of the media pack 104. The end plates 287' are preferably arcuate plates having a curvature substantially equal to the desired curvature of ends of the ultimate media pack 104. The top plate 281' helps maintain the width of the media pack 104 along the minor axis 284 while the end plates 287' maintain the length of the media pack 104 along the major axis 286 as well as maintain the accuracy of the curvature of the ends of the media pack 104 as the sealant bead 143 cures.

Actuators 290' operably coupled to the end plates 287' drive the end plates 287' along the major axis 286. After being removed from the mandrel 212, the media pack 104 is placed in the fixturing apparatus 282' with the top plate 281' and end plates 287' retracted, as illustrated in FIG. 30. Then, the top plate 281' and end plates 287' are driven towards the media pack 104 to secure the media pack 104 while the seal beads cure. In the illustrated embodiment, the end plates 287' abut against the top plate 281' after they have been actuated to fixture the media pack 104. However, other configurations are contemplated such as where the end plates 287' do not contact the to plate 281' or that do not slide along the table 283 or that do not extend completely along the ends of the media pack 104.

Figure 32:
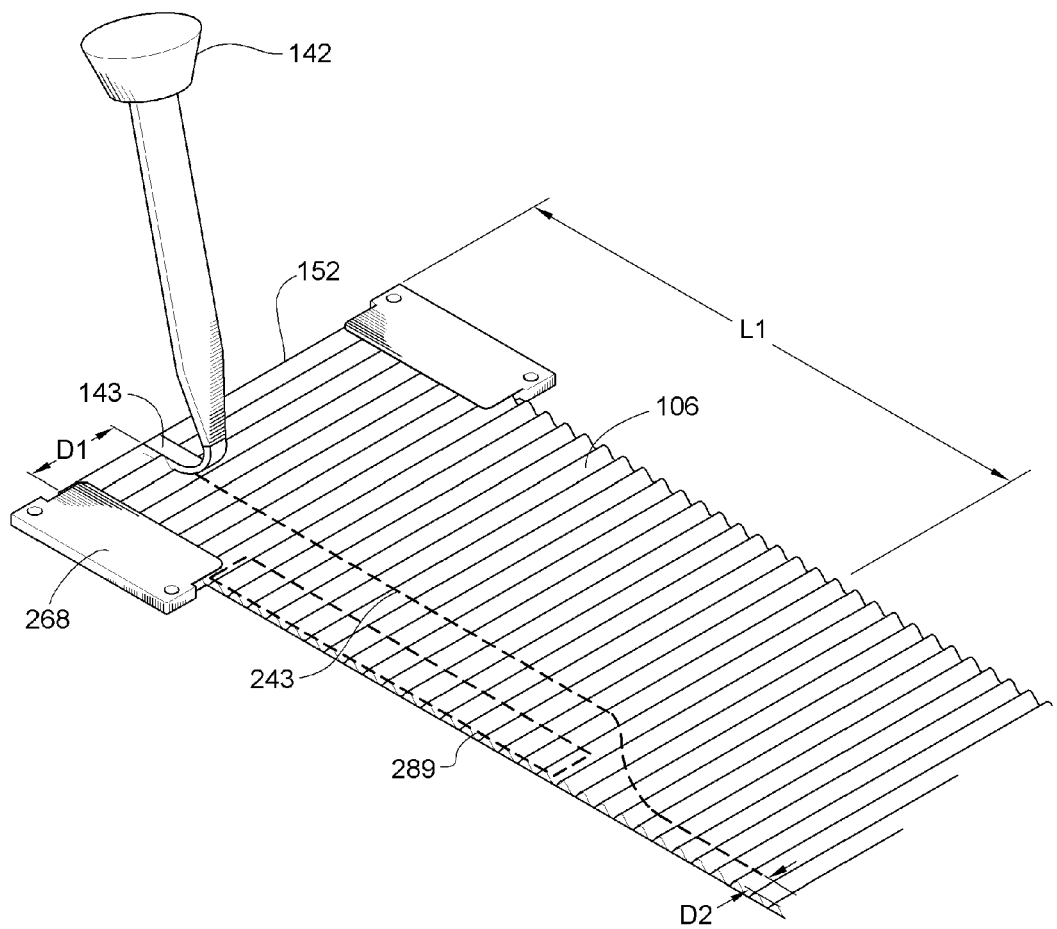
FIGS. 32 and 33 are perspective top views illustrating an exemplary seal bead feed path for applying a seal bead between adjacent layers of the fluted filter media.
Figure 33:
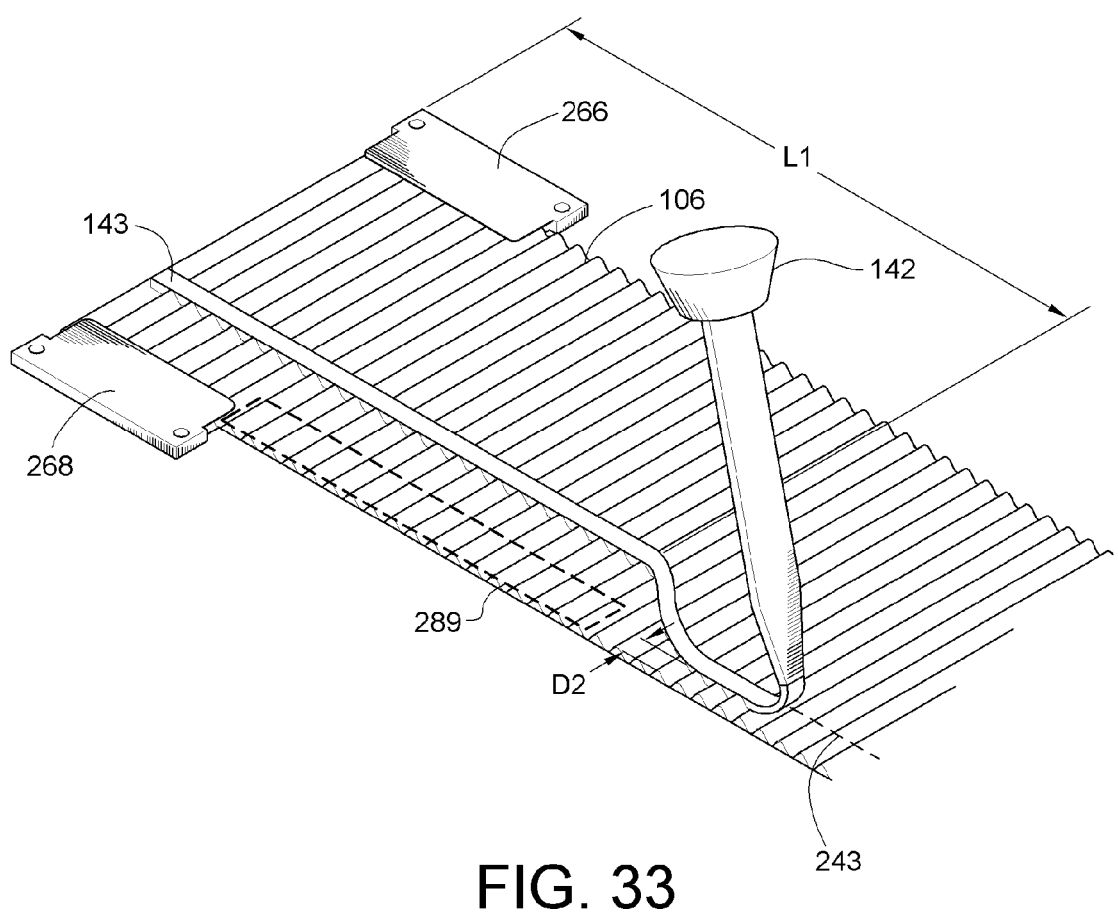

As discussed previously, an applicator 142 may be provided for dispensing a seal bead 143 to the web 106 during winding. FIGS. 32 and 33 illustrate a seal bead 143 being applied along a preferred bead path 243. The seal bead 143 seals one end of the flutes as is generally known in the art. The bead path 243 is designed to prevent the bead of sealant 143 from contacting the tools 266, 268 during winding.

As illustrated, the bead path 243 starts proximate the leading edge 152 of the web 106. The beginning of the bead path 243 starts at a location spaced a distance D1 from the longitudinal sides that is sufficiently interposed between the opposed tools 266, 268 to prevent the sealant bead 143 from contacting either of the tools 266, 268. In the illustrated bead path 243, the bead path first extends longitudinally a first length L1 from the leading edge 152. This first portion is generally parallel to the longitudinal sides of the web 106.

Next, the bead path 243 transitions laterally toward one of the longitudinal sides of the web 106. To prevent any of the sealant 143 from contacting the tool engaging the longitudinal side of the web 106, the portion of the bead path 243 that transitions toward the longitudinal edge does not pass across any portion of the web, i.e. a no application zone 289 illustrated in dashed lines, that directly contacts or is other wise adjacent to the outer periphery of the tools 266, 268 when the web 106 is wound. The no application zone 289 is located proximate the longitudinal side of the web 106 and is approximately equal to the length of the outer periphery of the tools 266, 268. The no application zone 289, extends laterally from the longitudinal side approximately the distance that the tools 266, 268 overlap the longitudinal sides of the web 106. Preferably, the no application zone 289 extends a sufficient distance beyond the overlap amount to provide a buffer to prevent any sealant 143 that settles or leaches during winding from contacting the tools 266, 268. The transition portion terminates at a second distance D2 from the longitudinal side of the web 106.

In one embodiment of the winding apparatus, the applicator 142 is movable relative to the mandrel 212 both laterally between the longitudinal sides of the web 106 as well as longitudinally along the bead path 243. In one method of applying the sealing bead 143, the applicator 142 moves along the bead path 243 until it reaches the end of the transition portion, prior to beginning winding of the web 106. Once the applicator 142 reaches this position, it remains at this position substantially until the media pack 104 is completely wound or at least until the sealant bead has been applied substantially the entire longitudinal length of the web 106 used to form the media pack 104. Once the sealant bead 143 has reached the end of the bead path 243, the applicator 142 stops applying sealant. The applicator 142 may be moved out of the way of the feed path to promote ease of removal of the media pack.

While the preferred embodiment has the applicator 142 start proximate the leading edge 152 and interposed between the two tools 266, 268 and then transition longitudinally away from the leading edge 152, alternatively, the applicator 142 could remain at a constant longitudinal position along the feed path 243 and move laterally and overlap one of the tools 268 to position the last portion of the bead proximate one of the longitudinal sides. In this situation, the applicator 142 would not be moved laterally to overlap the tool 268 until the tool 268 has been sufficiently wound with web 106 so as to prevent sealant from contacting the outer periphery of the tool 268. Using this method, the seal bead 243 would transition from being applied to the fluted sheet to the face sheet after the leading section of the web 1066 was wound.

Figure 34:
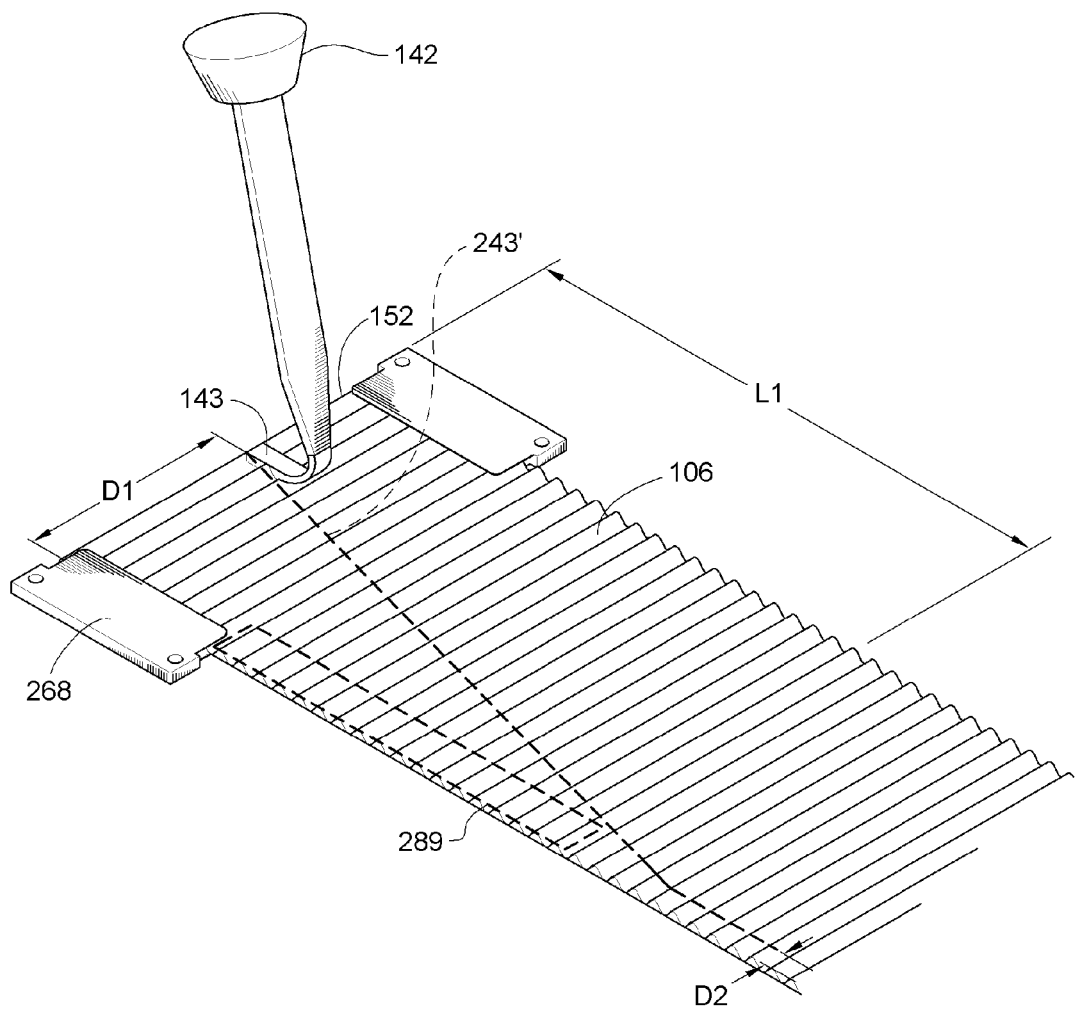
FIG. 34 is perspective top view of an alternative seal bead feed path.

Further, while the first bead path 243 was illustrated as starting out with a portion that runs substantially parallel to the longitudinal sides of the web 106, FIG. 34 illustrates an alternative bead path 243' that begins with a transitioning portion that transitions from the starting point proximate leading edge 152 toward one of the sides of the longitudinal edges, again with the transition portion bypassing the no application zone 289.

As discussed previously with reference to FIG. 11, it can be beneficial to cut the leading edge 152 of the web 106 through a peak 105 of the flute. However, this requires sealing that flute. In one method, the applicator 142 applies a lateral seal bead to the leading end 152 of the web 106 prior to applying the longitudinal extending seal bend 143. Applying the lateral bend may also be done manually or using an alternative applicator.

Figure 36:
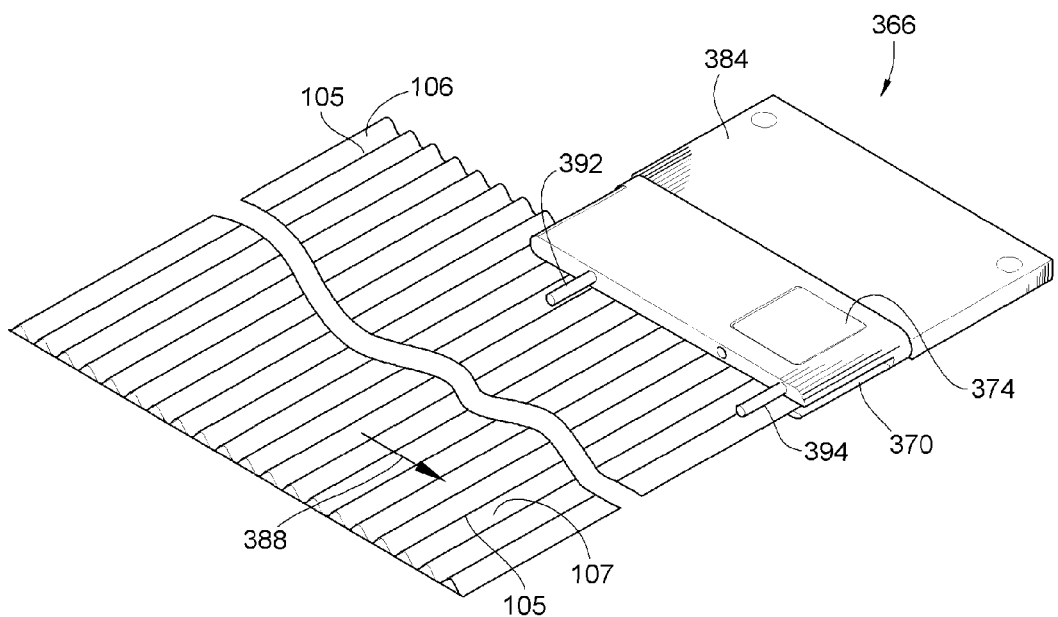

FIGS. 35 and 36 illustrate an alternative tool 366 for use with mandrel 212. While only one tool 366 is illustrated, it will be understood the tool 366 typically forms part of a pair of tools when used with a mandrel 212, similar to the pair of tools 266 and 268 discussed previously. The tool 366 has an elongated shape for facilitating directly winding the web 106 into a oblong or elongated shape. Tool 366 may be removably secured to the mandrel 212 in a similar manner as the tools 266, 268. The illustrated tool 366 similarly include a slot 370 for receiving and otherwise engaging the longitudinal side of the web 106.

This tool 366 includes a ribbed catch in the form of hinged member 374 that acts to engage the peaks 105 and valleys 107 of the web 106 to secure the web 106 in the slot 370. The hinged member 374 includes a tool face 376 that is adjacent to and forms part of one of the walls forming the slot 370 and an outer face 378 on an opposed side of the hinged member 374 as the tool face 376. Tool face 376 includes a plurality of peaks 380 and valleys 382 that correspond to and cooperate with valleys 107 and peaks 105, respectively, of the web 106 to increase the securement of the web 106 relative to the tool 366.

The hinged member 374 is pivotally mounted to a body 384 of the tool 366 by hinge 386. When the leading section of the web 106 is inserted into the slot 370 along a feed direction 388, the hinged member 274 will pivot relative to the hinge 386 to allow the web 106 to pass by the peaks 380 and valleys 382 of the slot face 376. In a preferred embodiment, when the hinged member 374 is engaged with web 106, the hinged member 374 is configured such that loading applied in a direction opposite the feed direction 388 causes the hinged member 374 to be biased towards the web 106 securing the web 106 within the slot 370. Alternatively, the tool 366 could include a clasp or catch that operatively secured the hinged member 274 in a closed position to prevent the hinged member 374 from opening and releasing the web 106.

Figure 37:
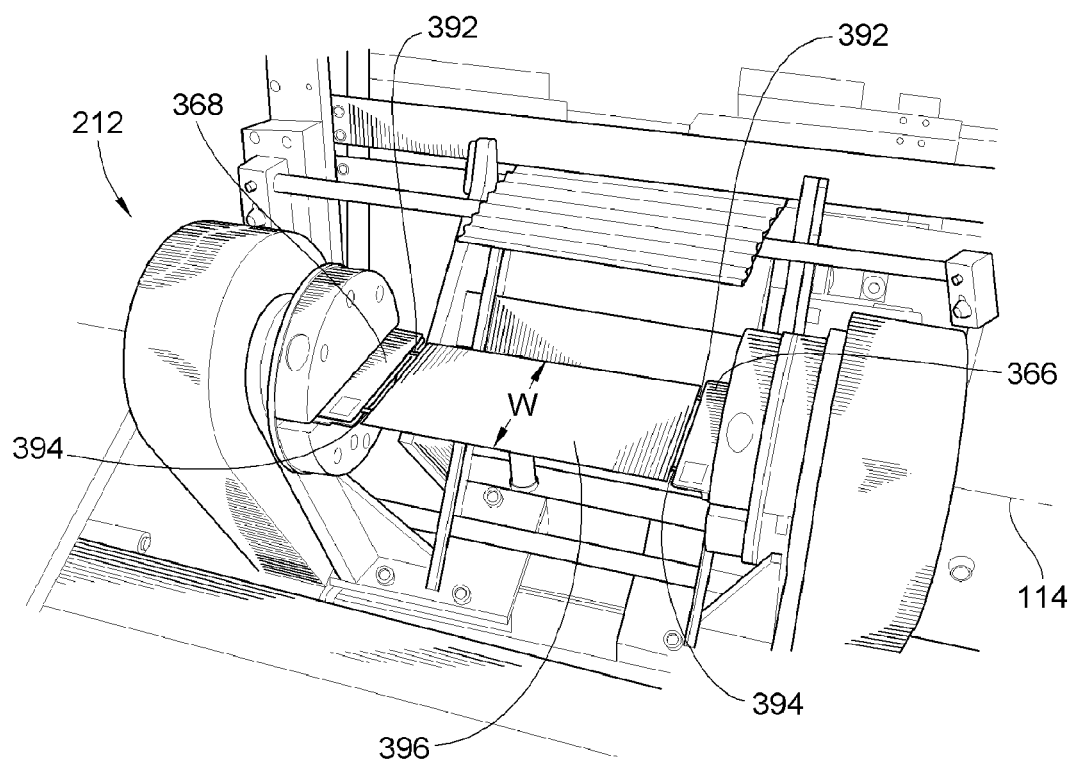
FIG. 37 is a perspective view of the mandrel of FIG. 18 incorporating the tooling of FIGS. 35 and 36 including a filter core secured thereto.

The illustrated tool 366 incorporates another feature that may or may not be incorporated into this or other tool designs. The tool 366 includes structure to secure a filter core 396 (See FIG. 37) to the mandrel 212 such that the mandrel 212 can be used to wind either cored media packs or coreless media packs. When winding a cored media pack, the core 396 remains with the media pack after it is removed from the mandrel 212.

With reference to FIGS. 35 and 36, the tool 366 includes a pair of posts 392, 394 that extend generally parallel to the axis of rotation 114 of the mandrel 212. The posts 392 are used to secure the core 396 between the tools 366, 368, when attached to the mandrel 212. The core 396 includes corresponding receptacles (not shown) for receiving the posts 392, 394. While the posts 392, 394 extend generally parallel to the axis of rotation 114, other configurations could be used. The configuration of the posts and the receptacles of the core are configured to permit the tools of the mandrel to be axially transitioned away from one another to release the wound media pack, as discussed previously. Further, the core 396 may be, but need not be, secured to both tools 366, 368. As illustrated, the core 396 has a width W that is shorter than the length L (see for reference FIG. 18) of the major axis of the tools 366, 368 by preventing relaxation. The core 396 can be used to maintain the elongated or oblong shape of the resulting media pack when it is removed from the tools 366, 368. The core 396 could have a width W that is greater than the length L of the tools 366, 368.

Figure 39:
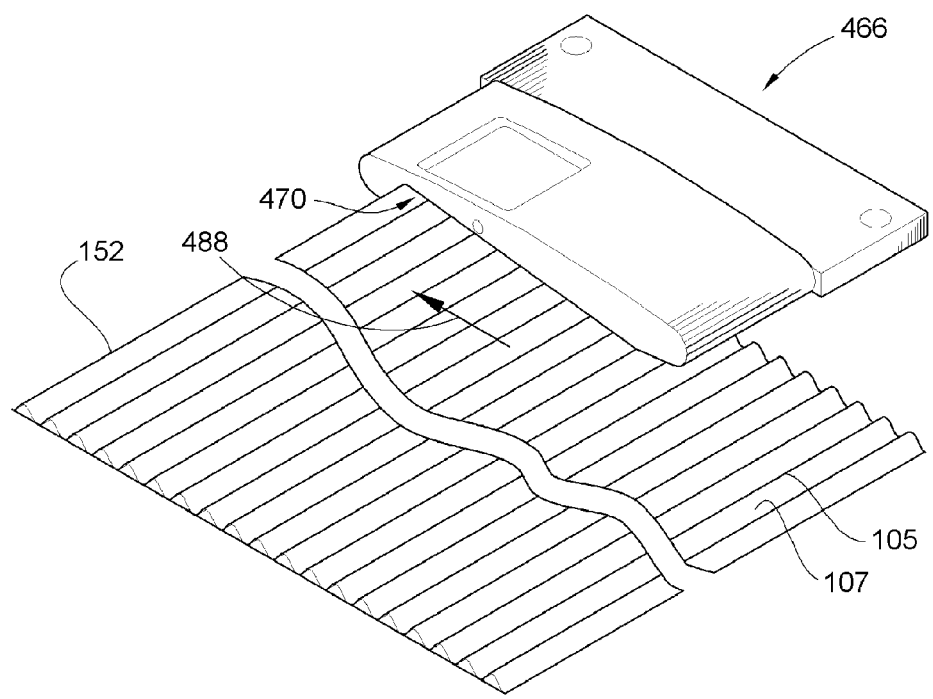

FIGS. 38 and 39 illustrate a further alternative tool 466 for use with mandrel 212. While only one tool 466 is illustrated, it will be understood that tool 466 forms part of a pair of tools when used with a mandrel 212, similar to the previously discussed embodiments. Similar to the previous tools, the tool 466 includes a channel or slot 470 for engaging and receiving a longitudinal side of the web 106. The slot 470 is not open on both ends. The slot 470 has opening 473 at one end and end wall 475 closing the other end. This configuration can be used to locate the leading edge 152 and leading portion of the web 106 relative to the tool 466. The end wall 475 interferes with the travel of the web 106 in the feed path direction 488 to stop and locate the leading edge 152 of the web 106 relative to the tool 466.

This embodiment illustrates that the outer periphery of the tools may be varied. In this embodiment, the portion of the tool 466 around which the web 106 is wound has a generally elliptical cross-section. This varied shape can be used to vary the ultimate shape of the media pack 104 after winding. Further, this embodiment illustrates that slot 470, which receives the longitudinal side of the web 106, need not be parallel with the major axis 484 of the tool 466.

Figure 41:
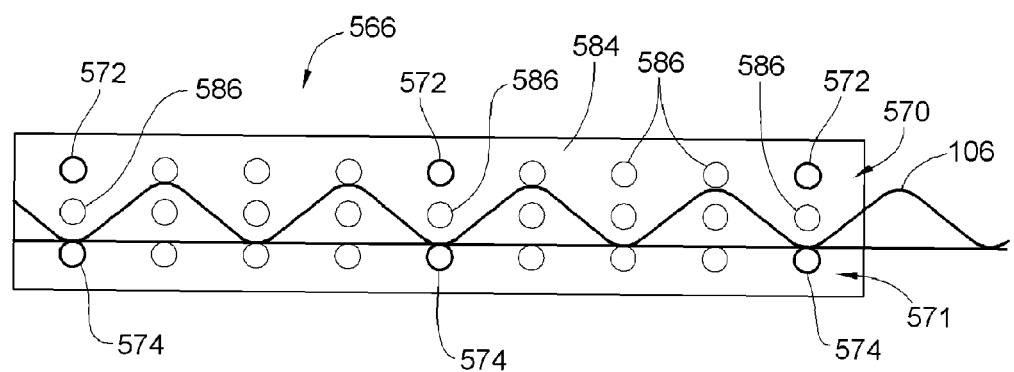

FIGS. 40 to 41 illustrate a further embodiment of a tool 566 for use with mandrel 212. The tool 566 includes a plurality of prongs including a row of top prongs 572 and a row of bottom prongs 574. The web 106 is wound around an outer periphery generally defined by the individual prongs 572, 574 to form the media pack 104. The body 584 of the tool 566 includes a plurality of receptacles 586 for adjusting the position of the prongs 572, 574. By adjusting the spacing and positioning between the prongs 572, 574, the internal major axis and internal minor axis and consequently the ultimate shape of a resulting media pack 104 can be altered. Additionally, this embodiment permits the tool width to be less than the width/depth of the leading portion of the media if desired.

The two rows of prongs 572, 574 are spaced apart and combine to define a boundary that forms of a slot or channel 570 there between. The channel 570 receives the web 106. In FIG. 41, the top and bottom prongs 572, 574 are spaced apart farther than the thickness of the web 106 to easily slidingly receive the web 106 in an end opening 571 of the slot 570.

Figure 42:
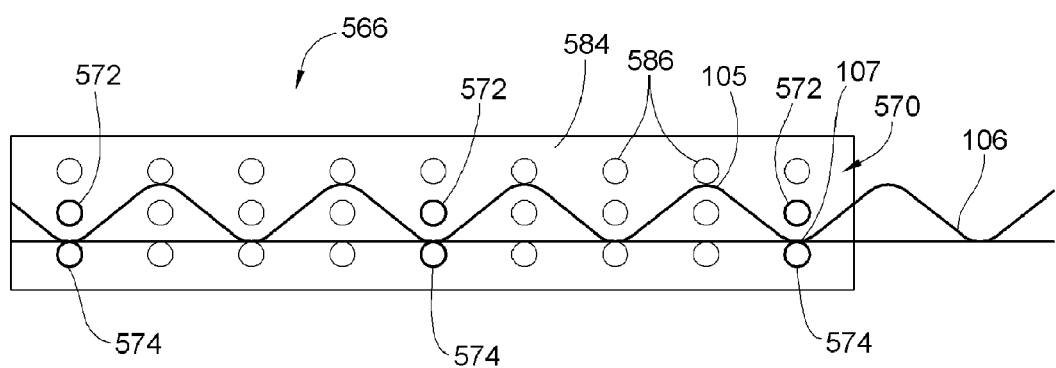

The portion of the surfaces of the row of top prongs 572 that face the row of bottom prongs 574 combine to form a tool face, albeit a discontinuous tool face. Similarly, the portion of the surfaces of the row of bottom prongs 574 that face the top prongs 572 combine to form a discontinuous tool face. As illustrated in FIGS. 41 and 42, the web 106 is received on the tool face defined by the bottom prongs 574.

While the illustrated tool 566 includes three top prongs 572 and three bottom prongs 574 in each row, the tool 566 need not include that many prongs. The middle two prongs 572, 574 of each row are merely used for support of the media as it is initially fed into slot 570 and as it is wound around the tool 566.

Further, as illustrated in FIG. 42, the top row of prongs 572 could be adjusted to the middle row of receptacles 586 to adjust the engagement of the tool 566 with the web 106. In this configuration the gap between the top row of prongs 572 and the bottom row of prongs 574 is less than the thickness of the web 106 at a peak 105. In this configuration, the top prongs 572 insert into and penetrate valleys 107 between adjacent peaks 105 of the web 106. This configuration can reduce the amount of slip that the web 106 may experience during the initial winding of the leading portion of the web 106. Slippage does not affect the defined major axis however, because the media is wrapped around the tooling in which the exterior of the tooling can be utilized to define the major axis of the resulting media pack. When using this tooling, it may be required to transition the opposed tools towards each other to engage the web 106. As the tools 566 transition towards one another, the prongs 572 will insert into the valleys 107 and the bottom prongs 574 will pass below the face sheet. Alternatively, the prongs 572 may insert directly into a flute.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. All geometric references such as "radial," "annular," "diametric," "concentric," "upper," "lower," "inner," "outer," "forward," "back," and the like, are exemplary only and are not to be construed as limitations on the invention.

No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming an elongated fluted filter media pack, comprising:
   supplying a face sheet and a fluted sheet that are joined together to provide a fluted filter media;
   engaging a first side of the fluted filter media with a first tool and a second side of the fluted filter media with a second tool;
   defining an internal major axis of the filter media pack with at least one of the first and second tools to generally establish the elongated shape of the media pack;
   winding the fluted filter media through rotation of the first tool and second tools; and
   wherein engaging the first side includes trapping the first side in a first slot of the first tool and engaging the second side includes trapping the second side in a second slot of the second tool.

2. The method of claim 1, further comprising:
   providing a leading section of the fluted filter media about which the fluted filter media pack is to be wound;
   feeding the fluted filter media to a winder along a first direction;
   winding the fluted filter media, to form layers of fluted filter media, at a variable rotational speed about the leading section, including winding more quickly when the major axis is transverse to the first direction as opposed to when the major axis is generally parallel to the first direction.

3. The method of claim 2, wherein the rotational speed of the winding is continuously varied.

4. The method of claim 3, wherein the rotational speed of the winding is ramped up as the major axis approaches being transverse to the first direction and is ramped down as the major axis approaches being generally parallel to the first direction.

5. The method of claim 4, wherein feeding includes feeding at a substantially constant speed.

6. The method of claim 5, wherein the filter media is fed at substantially constant tension and the tools are driven with varying torque to maintain the tension of the media.

7. The method of claim 1, further including applying a seal bead to the fluted filter media along a bead path, wherein the bead path begins at a position substantially at a leading edge of the fluted filter media and at a first distance from the first side of the fluted filter media being between the first and second tools and the bead path extends longitudinally away from the leading edge and laterally to a second distance from the first side of the fluted filter media, the second distance being less than the first distance.

8. The method of claim 7, wherein while engaging the first and second sides, the first and second tools overlap the first and second sides a third distance, the third distance being less than the first distance and greater than the second distance, and wherein the seal bead application path does not cross any portion of the fluted filter media that is directly adjacent either the first or second tool when the fluted filter media is wound.

9. The method of claim 1, wherein winding the fluted filter media layer includes winding the fluted filter media layer around a core operably mounted to at least one of the first and second tools, the core remaining with the media pack after the media pack is formed.

10. The method of claim 9, wherein the core is slightly shorter in width than a length of the first and second tools, and the method further includes maintaining, at least partially, the internal major axis with the core after the media pack is removed from the first and second tools.

11. The method of claim 1, further comprising:
    fixturing the media pack along in a direction perpendicular to the internal major axis to maintain the elongated shape.

12. The method of claim 11 further including removing the media pack from a winding apparatus used for winding the fluted filter media, the winding apparatus including the first and second tools, wherein removing is performed prior to fixturing.

13. The method of claim 11 further including fixturing the media pack along the internal major axis.

14. The method of claim 1, further comprising transitioning the first and second tools axially toward each other prior to winding and transitioning the first and second tools away from each other after winding.

15. The method of claim 1, wherein winding the fluted filter media is coreless winding such that a core does not remain with the media pack after the media pack is formed.

16. The method of claim 1, wherein the fluted sheet forms peaks and valleys and trapping the first side and trapping the second side includes engaging a valley of the fluted sheet with an edge of each of the first and second tools, the edges extending transverse to the first and second sides of the fluted filter media.

17. The method of claim 1, wherein the fluted sheet forms adjacent peaks and valleys and trapping the first side and trapping the second side includes engaging the first and second sides with corresponding peaks and valleys of first and second hinged members of the first and second tools, respectively.

18. The method of claim 1, wherein defining the internal major axis substantially establishes the elongated shape of the wound fluted filter media pack without requiring deformation.

19. A method of forming an elongated fluted filter media pack, comprising:

supplying a face sheet and a fluted sheet that are joined together to provide a fluted filter media;

engaging a first side of the fluted filter media with a first tool having a first slot including a first tool face;

receiving a leading section of the face sheet on the first tool face;

defining a major axis prior to winding of the elongated fluted filter media pack with at least one of a first length of the first tool face and a second length of the leading section that is received in the first slot;

winding the filter media to form wound layers of the filter media; and wherein engaging includes engaging a second side of fluted filter media with a second tool having a second slot defining a second tool face, the first and second slots being elongated slots, and wherein engaging further includes inserting a leading section of the fluted filter media into the second slot such that the leading section of the face sheet is received on the second tool face.

20. The method of claim 19, further comprising generally maintaining an elongated shape of the fluted filter media pack as defined by the major axis such that the fluted filter media pack does not relax.

21. The method of claim 20, wherein maintaining the elongated shape includes fixturing the fluted filter media pack after winding to prevent relaxation or unwinding.

22. The method of claim 21, further including providing a seal bead between the wound layers of the filter media, and wherein fixturing includes clamping the media pack in a direction perpendicular to the major axis while curing of at least the provided seal bead.

* * * * *